US012338310B2

(12) United States Patent
Chwalba et al.

(10) Patent No.: US 12,338,310 B2
(45) Date of Patent: Jun. 24, 2025

(54) USE OF METAL COMPLEXES HAVING ORGANIC LIGANDS FOR ACTIVATING OLEFIN METATHESIS RUTHENIUM (PRE)CATALYSTS

(71) Applicant: APEIRON SYNTHESIS SPOLKA AKCYJNA, Wroclaw (PL)

(72) Inventors: Michal Chwalba, Wroclaw (PL); Konrad Kurcbach, Brzeziny (PL); Krzysztof Greda, Wroclaw (PL); Rafal Gawin, Warsaw (PL); Krzysztof Skowerski, Jablonowo Pomorskie (PL)

(73) Assignee: APEIRON SYNTHESIS SPOLKA AKCYJNA, Wroclaw (PL)

( * ) Notice: Subject to any disclaimer, the term of this patent is extended or adjusted under 35 U.S.C. 154(b) by 797 days.

(21) Appl. No.: 17/600,832

(22) PCT Filed: Mar. 31, 2020

(86) PCT No.: PCT/EP2020/059181
§ 371 (c)(1),
(2) Date: Oct. 1, 2021

(87) PCT Pub. No.: WO2020/201314
PCT Pub. Date: Oct. 8, 2020

(65) Prior Publication Data
US 2022/0177612 A1   Jun. 9, 2022

(30) Foreign Application Priority Data

Apr. 2, 2019 (PL) .......................................... 429476

(51) Int. Cl.
*C08F 4/50* (2006.01)
*C08F 2/06* (2006.01)
*C08F 10/00* (2006.01)

(52) U.S. Cl.
CPC ................. *C08F 4/50* (2013.01); *C08F 2/06* (2013.01); *C08F 10/00* (2013.01); *B01J 2231/54* (2013.01); *B01J 2531/16* (2013.01); *B01J 2531/821* (2013.01); *C08G 2261/418* (2013.01)

(58) Field of Classification Search
CPC ..... C08F 4/50; C08F 2/06; C08F 10/00; B01J 2231/54; B01J 2531/16; B01J 2531/821; C08G 2261/418; C08G 2261/76; C08G 61/08; C08G 2261/135; C08G 2261/3325
See application file for complete search history.

(56) References Cited

U.S. PATENT DOCUMENTS

| | | |
|---|---|---|
| 6,107,420 A | 8/2000 | Grubbs et al. |
| 6,284,852 B1 | 9/2001 | Lynn et al. |
| 6,486,279 B2 | 11/2002 | Lynn |
| 2005/0261451 A1 | 11/2005 | Ung et al. |
| 2016/0003184 A1 | 1/2016 | Muennich et al. |
| 2016/0355454 A1 | 12/2016 | Jost |
| 2017/0145152 A1 | 5/2017 | Verpoort |
| 2018/0037677 A1* | 2/2018 | Cruce ....................... C08J 5/247 |
| 2021/0269565 A1* | 9/2021 | Skowerski ............ C08F 4/7026 |

FOREIGN PATENT DOCUMENTS

| | | |
|---|---|---|
| EP | 1757613 A1 | 2/2007 |
| TW | 200950884 A | 12/2009 |
| WO | 2012168183 A1 | 12/2012 |
| WO | 2014144634 A1 | 9/2014 |
| WO | 2016100101 A1 | 6/2016 |
| WO | 2017187434 A1 | 11/2017 |
| WO | WO-2018197963 A1 * | 11/2018 .......... B01J 31/1616 |

OTHER PUBLICATIONS

B. K. Keitz, R. H. Grubbs, J. Am. Chem. Soc. 2009, 131, 2038-2039.
Ben-Asuly, A.; Tzur, E.; Diesendruck, C. E; Sigalov, M.; Goldberg, I.; Lemcoff, N. G. Organometallics, 2008, 27 (5), 811-813.
Disendruck, C. E.; Vidavsky, Y.; Ben-Asuly, A.; Lemcoff, N. G. J. Polym. Sci., Part A: Polym. Chem. 2009, 47, 4209-4213.
Szadkowska, A.; Gstrein, X.; Burtscher, D.; Jarzembska, K.; Woźniak, K.; Slugovc, C.; Grela, K. Organometallics 2010, 29, 117-124.
C. A. Citadelle, E. Le Nouy, F. Bisaro, A. M. Z. Slawin, C. S. J. Cazin, Dalton Trans. 2010, 39, 4489-4491.
T. Wilczewski, M. Bocheńska, J. F. Biernat, J. Organomet. Chem. 1981, 215, 87-96.
J. D. Gilbert, G. Wilkinson, J. Chem. Soc. A, 1969, 0, 1749-1753.
P. D. de Koning, M. Jackson, I. C. Lennon, Org. Process Res. Dev. 2006, 10, 1054-1058.

* cited by examiner

Primary Examiner — Andrew J. Oyer
(74) Attorney, Agent, or Firm — Dickinson Wright PLLC; Andrew D. Dorisio

(57) ABSTRACT

Use of compounds selected from copper complexes having at least one organic ligand and ruthenium complexes having at least one organic ligand, for activating olefin metathesis ruthenium (pre)catalysts in a metathesis reaction, in particular in the ring opening metathesis polymerization reaction (ROMP).

18 Claims, No Drawings

USE OF METAL COMPLEXES HAVING ORGANIC LIGANDS FOR ACTIVATING OLEFIN METATHESIS RUTHENIUM (PRE)CATALYSTS

TECHNICAL FIELD

The invention relates to use of metal complexes containing at least one organic ligand for the activation of the so-called dormant olefin metathesis ruthenium (pre)catalysts. Furthermore, the invention relates to the use of such a catalytic system in a ring opening metathesis polymerization reaction.

BACKGROUND

The synthesis of the carbon-carbon double bond via olefin metathesis is of great importance both in organic synthesis and in the chemical industry. Ruthenium catalysts due to their high stability and durability in the presence of various functional groups are very useful in reactions such as RCM—ring closing metathesis, CM—cross metathesis, ROMP—ring opening metathesis polymerization [R. H. Grubbs (Editor), A G Wenzel (Editor), D. J O'Leary (Editor), E. Khosravi (Editor), *Handbook of Olefin Metathesis, 2nd edition,* 3 volumes 2015, John Wiley & Sons, Inc., 1608 pages].

Due to the reaction mechanism and the nature of the resulting product, RCM and CM reactions require (pre)catalysts of a different type than the ROMP polymerization reaction. In case of RCM and CM reactions, fast initiating (pre)catalysts with high conversion rates and selectivity are useful. In ROMP reactions, macromolecular products are formed, so initiators are required that enable to control the polydispersity degree of the resulting polymer. Catalysts showing reduced activity in the presence of monomer at room temperature are used, so-called latent catalysts. One of the advantages of dormant catalysts is the ability to pre-prepare the monomer-(pre)catalyst mixture.

Development of stable, well-defined metathesis catalysts has opened new possibilities for metathesis polymerization reactions. Activation of dormant catalysts requires physical stimuli from outside. A dormant (pre)catalyst usually contains a chelating (donor) ligand that "blocks" the coordination site so that the complex shows reduced activity. Activation occurs after dissociation of chelating ligand and exposing the coordination center of the metal. Dissociation of the chelating ligand requires chemical stimulation (most often using an acid (Lewis or Brönsted)), thermal or light having appropriate wavelength. An activating agent is called an activator or a co-catalyst, while an activator-(pre)catalyst system is called a catalytic system. A mixture of monomer and optionally other additives together with the catalytic system is called a formulation.

In the prior art chemical activators being Lewis and Brönsted acids have been described, such as: HCl, HBr, HI, $CH_3COOH$, $CF_3COOH$, HCOOH, $ZnCl_2$, CuCl, $SnCl_2$, $HBF_4$ (U.S. Pat. No. 6,284,852 B1, WO 2016 100101 A1, US 20170145152 A1, US 2016 003184 A1, EP 1757613 B1).

Photochemical activation can be accomplished by using acid-activated (pre)catalysts and photoacid generators (PAG). Photoacid generators are usually sulfonium salts. During UV irradiation, an acid particle is released from PAG. Exemplary systems are disclosed in: U.S. Pat. No. 6,284,852 B1, U.S. Pat. No. 6,486,279, B. K. Keitz, R. H. Grubbs, *J. Am. Chem. Soc.* 2009, 131, 2038-2039. Another solution is to use catalysts whereby inactive isomer is transformed under the influence of light into the active isomer. Examples include ruthenium catalysts with chelating sulfur atom described by Lemcoff (Ben-Asuly, A.; Tzur, E.; Diesendruck, C. E; Sigalov, M.; Goldberg, I.; Lemcoff, N. G. *Organometallics,* 2008, 27 (5), 811-813.

Examples of thermally activated ruthenium (pre)catalysts for ROMP polymerization are described in: US 2005 0261451, U.S. Pat. No. 6,107,420, Disendruck, C. E.; Vidavsky, Y.; Ben-Asuly, A.; Lemcoff, N. G. *J. Polym. Sci., Part A: Polym. Chem.* 2009, 47, 4209-4213, Szadkowska, A.; Gstrein, X.; Burtscher, D.; Jarzembska, K.; Wozniak, K.; Slugove, C.; Grela, K. *Organometallics* 2010, 29, 117-124.

A significant disadvantage of chemical or photochemical activation with PAG is the acid molecule that is released, which can cause corrosion and destruction of moulds. In addition, this type of activation allows only limited control of the initiation rate. Once acid is released, the polymerization reaction takes 1 to 10 minutes. As a result, due to the rapidly increasing viscosity, the time for process (operative) actions is very short (working life). This is related to a mechanism of activation of dormant (pre)catalysts—after the formation of the acid molecule, ligands in the (pre)catalyst are protonated and an active, rapidly initiating metathesis catalyst is formed.

A disadvantage of thermal activation is a difficulty of even and rapid heating of the formulation. As a result (and also due to the nature of initiation) the (pre)catalyst does not initiate completely, the effect of which is the appearance of defects resulting from material shrinkage, much larger than in the case of chemical activation. Another problem is a short storage time of the formulation (shelf life), because dormant thermally activated catalysts show low activity even at room temperature, sufficient to solidify/gel the formulation within a period of several minutes to several hours. This means that the polymerization reaction starts before the heat is provided, immediately after the (pre)catalyst is added.

Surprisingly it turned out that metal complexes: Ru, Cu, having organic ligands can act as co-catalysts in metathetical polymerization reactions and allow to get very long formulation life times and to control gelling time after activation within a very broad time range (from several seconds to several hours). In the light of the prior art it is not obvious that complexes of general formulae 1a and 1b can act as activators of olefin metathesis ruthenium (pre)catalysts.

Activators according to the invention have universal use. Compounds described by general formulae 1a and 1b activate not only "classic" dormant complexes having a chelating ligand—of general formulae 3a-d. They also act as carbene acceptors, and for this reason they can be used to activate (pre)catalysts having two neutral ligands in the coordination sphere ((pre)catalysts of general formula 2).

Thus, the subject of the invention is the use of compounds which are:
copper complexes having at least one organic ligand, or
ruthenium complexes having at least one organic ligand
for activating olefin metathesis ruthenium (pre)catalysts in a metathesis reaction, in particular in the ring opening metathesis polymerization reaction (ROMP).

Preferably, the copper complexes being the activators of olefin metathesis ruthenium (pre)catalysts have the structure described by a general formula 1a:

$$(CuX_aL_b)_c \qquad 1a$$

wherein:
a is 1 or 2;
b is an integer from 1 to 3;
c is 1 or 2;
X is an anionic ligand selected from a halogen atom, —CN, —SCN, —OR', —SR', —O(C=O)R', —O(SO$_2$)R' or —OSi(R')$_3$ group, wherein R' is a C$_1$-C$_{12}$ alkyl, C$_3$-C$_{12}$ cycloalkyl, C$_2$-C$_{12}$ alkenyl or C$_5$-C$_{20}$ aryl;
L is independently a neutral ligand selected independently from cyclooctadiene, dicyclopentadiene and a P(R')$_3$ group, wherein each R' may be the same or different and denotes C$_1$-C$_{12}$ alkyl, C$_3$-C$_{12}$ cycloalkyl, C$_5$-C$_{20}$ aryl, C$_2$-C$_{12}$ alkoxy, C$_5$-C$_{24}$ aryloxy or C$_3$-C$_{12}$ heteroaryl, and R' groups may interconnect with each other via carbon atoms forming a 3-12 membered ring; whereby the neutral L ligands may interconnect with each other, forming bidentate or tridentate ligands; or L is a neutral ligand defined by a general formula 4a, 4b or 4c:

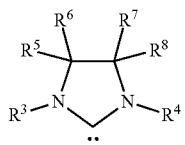
4a

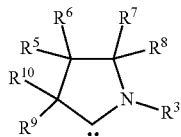
4b

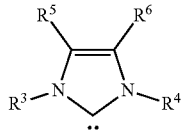
4c wherein:
each of R$^3$ and R$^4$ is independently C$_1$-C$_{12}$ alkyl, C$_3$-C$_{12}$ cycloalkyl, C$_5$-C$_{20}$ aryl or C$_5$-C$_{20}$ heteroaryl, which may be substituted independently with one and/or more substituents selected from the group comprising C$_1$-C$_{12}$ alkyl, C$_1$-C$_{12}$ perhaloalkyl, C$_1$-C$_{12}$ alkoxy, C$_5$-C$_{24}$ aryloxy, C$_5$-C$_{20}$ heteroaryloxy or a halogen atom;
each of R$^5$, R$^6$, R$^7$, R$^8$, R$^9$, R$^{10}$ is independently a hydrogen atom, C$_1$-C$_{12}$ alkyl, C$_3$-C$_{12}$ cycloalkyl, C$_5$-C$_{20}$ aryl or C$_5$-C$_{20}$ heteroaryl, optionally substituted with at least one C$_1$-C$_{12}$ alkyl, C$_1$-C$_{12}$ perhaloalkyl, C$_1$-C$_{12}$ alkoxy or a halogen atom, and the R$^5$, R$^6$, R$^7$, R$^8$, R$^9$, R$^{10}$ groups may optionally interconnect with each other forming a C$_4$-C$_{10}$ cyclic or a C$_4$-C$_{12}$ polycyclic system,
while ruthenium complexes being activators of olefin metathesis ruthenium (pre)catalysts have the structure described by a general formula 1b:

(RuX$^1$$_k$X$^2$$_l$L$^2$$_n$)$_o$      1b wherein:
k is an integer from 0 to 2;
l is 0 or 1;
m is an integer from 0 to 4;
n is an integer from 0 to 2;
o is the number 1 or 2;

each of X$^1$ and X$^2$ is independently an anionic ligand;
each of L$^1$ and L$^2$ is independently a P(R')$_3$ group, wherein each R' may be the same or different and is C$_1$-C$_{12}$ alkyl, C$_3$-C$_{14}$ cycloalkyl, C$_5$-C$_{14}$ aryl or C$_3$-C$_{12}$ heteroaryl, and R' groups may interconnect with each other via carbon atoms forming a 3-12 membered ring; or L$^1$ and/or L$^2$ ligands may connect with each other forming a bidentate ligand defined by general formulae 5a or 5b:

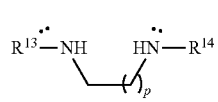
5a

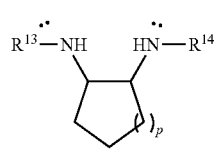
5b wherein:
p is the number 1 or 2;
each of R$^{13}$ and R$^{14}$ is independently a hydrogen atom, C$_1$-C$_{12}$ alkyl, C$_3$-C$_{14}$ cycloalkyl or C$_5$-C$_{14}$ aryl, optionally substituted with at least one C$_1$-C$_5$ alkyl, C$_3$-C$_6$ cycloalkyl, C$_5$-C$_{14}$ aryl or halogen atom;
or L$^2$ ligand is a carbene ligand of the structure:

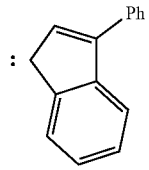

or each of L$^1$ and L$^2$ is independently a neutral ligand selected from benzene, p-cymene, mesitylene and cyclooctadiene.

Preferably, the copper complexes being the activators of olefin metathesis ruthenium (pre)catalysts have the structure defined by a general formula 1a:

(CuX$_a$L$_b$)$_c$      1a wherein:
a is 1 or 2;
b is an integer from 1 to 3;
c is 1 or 2;
X is independently an anionic ligand selected from a halogen atom, —O(C=O)R', —OR' or —SR' group, wherein R' is a C$_1$-C$_{12}$ alkyl, a C$_5$-C$_{20}$ aryl;
L is independently a neutral ligand selected independently from cyclooctadiene, dicyclopentadiene and a P(R')$_3$ group, wherein each R' may be the same or different and is C$_1$-C$_{12}$ alkyl, C$_3$-C$_{12}$ cycloalkyl, C$_5$-C$_{20}$ aryl, C$_2$-C$_{12}$ alkoxy, C$_5$-C$_{24}$ aryloxy or C$_3$-C$_{12}$ heteroaryl, and whereby R' groups may interconnect with each other via carbon atoms forming a 3-12 membered ring; where the neutral L ligands may interconnect with each other, forming bidentate or tridentate ligands; or L is a neutral ligand defined by general formulae 4a or 4b:

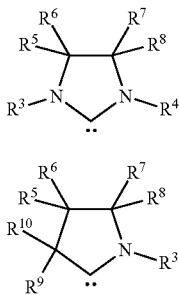

wherein:
- each of $R^3$ and $R^4$ is independently $C_1$-$C_{12}$ alkyl, $C_3$-$C_{12}$ cycloalkyl, $C_5$-$C_{20}$ aryl or $C_5$-$C_{20}$ heteroaryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;
- each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system, while the ruthenium complexes being the activators of olefin metathesis ruthenium (pre)catalysts have the structure defined by a general formula 1b:

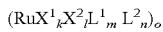

wherein:
- k is an integer from 0 to 2;
- l is 0 or 1;
- m is an integer from 0 to 4;
- n is an integer from 0 to 2;
- o is 1 or 2;
- each of $X^1$ and $X^2$ is independently a halogen atom, —O(C=O)R' group, wherein R' is $C_1$-$C_{12}$ alkyl, $C_3$-$C_{14}$ cycloalkyl or $C_5$-$C_{14}$ aryl, and wherein R' is optionally substituted with at least one $C_1$-$C_5$ alkyl, $C_3$-$C_6$ cycloalkyl, $C_5$-$C_{14}$ aryl or a halogen atom; or each of $X^1$ and $X^2$ is independently an anionic ligand defined by general formulae 6a, 6b and 6c:

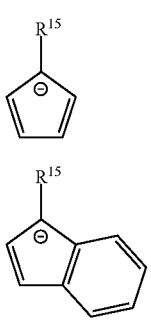

wherein:
- $R^{15}$ is a hydrogen atom, $C_1$-$C_{12}$ alkyl, $C_3$-$C_{14}$ cycloalkyl, $C_5$-$C_{14}$ aryl, —(C=O)R' group or —O(C=O)R' group, wherein R' is $C_1$-$C_{12}$ alkyl, $C_3$-$C_{14}$ cycloalkyl or $C_5$-$C_{14}$ aryl, whereby $R^{15}$ is optionally substituted with at least one $C_1$-$C_5$ alkyl, $C_3$-$C_6$ cycloalkyl, $C_5$-$C_{14}$ aryl or a halogen atom;
- or $X^1$ and $X^2$ are a bidentate anionic ligand defined by a general formula 7a:

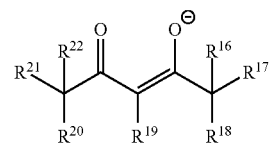

wherein:
- each of $R^{16}$, $R^{17}$, $R^{18}$, $R^{19}$, $R^{20}$, $R^{21}$, $R^{22}$ is independently a hydrogen atom, $C_1$-$C_{12}$ alkyl, $C_3$-$C_{14}$ cycloalkyl, $C_5$-$C_{14}$ aryl or halogen atom; whereby each of $R^{16}$, $R^{17}$, $R^{18}$, $R^{19}$, $R^{20}$, $R^{21}$, $R^{22}$ is optionally substituted with at least one $C_1$-$C_5$ alkyl, $C_3$-$C_6$ cycloalkyl, $C_5$-$C_{14}$ aryl or a halogen atom;
- each $L^1$ and $L^2$ is independently a $P(R')_3$ group, wherein each R' can be the same or different and is $C_1$-$C_{12}$ alkyl, $C_3$-$C_{14}$ cycloalkyl, $C_5$-$C_{14}$ aryl or $C_3$-$C_{12}$ heteroaryl, and whereby R' groups may interconnect each other via carbon atoms forming a 3-12 membered ring,
- or $L^2$ ligands may connect with each other forming a bidentate ligand defined by general formulae 5a or 5b:

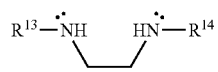

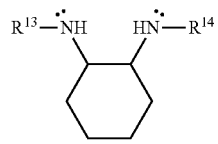

wherein:
- each of $R^{13}$ and $R^{14}$ is independently a hydrogen atom, $C_1$-$C_{12}$ alkyl or $C_5$-$C_{14}$ aryl, which may be independently substituted with one and/or more substituents selected from the group comprising $C_1$-$C_5$ alkyl, $C_3$-$C_6$ cycloalkyl or $C_5$-$C_{14}$ aryl;

or $L^2$ ligand is a carbene ligand having the structure:

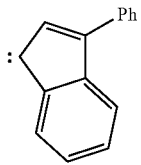

or each $L^1$ and $L^2$ is independently a neutral ligand selected from benzene and cyclooctadiene.

Preferably, the copper complexes being the activators of olefin metathesis ruthenium (pre)catalysts have the structure described by a general formula 1a:

$(CuX_aL_b)_c$  1a wherein:
a is 1 or 2;
b is an integer from 1 to 3;
c is 1 or 2;
X is a halogen atom,
L is independently a neutral ligand selected independently from cyclooctadiene, dicyclopentadiene and a $P(R')_3$ group, wherein each R' may be the same or different and is $C_1$-$C_{12}$ alkyl, $C_3$-$C_{12}$ cycloalkyl or $C_5$-$C_{20}$ aryl, and whereby R' groups may interconnect with each other via carbon atoms forming a 3-12 membered ring; whereby neutral ligands L may interconnect with each other forming bidentate or tridentate ligands; or L is a neutral ligand defined by a general formula 4a:

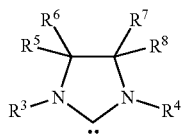

4a wherein:
each of $R^3$ and $R^4$ is independently $C_5$-$C_{20}$ aryl, optionally substituted with at least one $C_1$-$C_{12}$ alkyl;
each of $R^5$, $R^6$, $R^7$, $R^8$ is independently a hydrogen atom;
while the ruthenium complexes being the activators of olefin metathesis ruthenium (pre)catalysts have the structure defined by a general formula 1b:

$(RuX^1_kX^2_lL^1_mL^2_n)_o$  1b wherein:
k is an integer from 0 to 2;
l is 0 or 1;
m is an integer from 0 to 4;
n is an integer from 0 to 2;
o is 1 or 2;
each of $X^1$ and $X^2$ is independently a halogen atom, —O(C=O)R' group or —O(C=O)R' group, wherein R' is $C_1$-$C_{12}$ alkyl, $C_3$-$C_{14}$ cycloalkyl or $C_5$-$C_{14}$ aryl, whereby R' is optionally substituted with at least one $C_1$-$C_5$ alkyl, $C_3$-$C_6$ cycloalkyl, $C_5$-$C_{14}$ aryl or a halogen atom;

or each of $X^1$ and $X^2$ is independently anionic ligand described by general formula 6a:

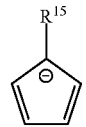

6a wherein:
$R^{15}$ is a hydrogen atom, $C_1$-$C_{12}$ alkyl, $C_3$-$C_{14}$ cycloalkyl, $C_5$-$C_{14}$ aryl or a —O(C=O)R' group, wherein R' is $C_1$-$C_{12}$ alkyl, $C_3$-$C_{14}$ cycloalkyl or $C_5$-$C_{14}$ aryl, whereby $R^{15}$ is optionally substituted with at least one $C_1$-$C_5$ alkyl, $C_3$-$C_6$ cycloalkyl, $C_5$-$C_{14}$ aryl, or a halogen atom; or $X^1$, $X^2$ are a bidentate anionic ligand defined by a general formula 7a:

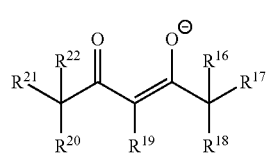

7a wherein:
each of $R^{16}$, $R^{17}$, $R^{18}$, $R^{19}$, $R^{20}$, $R^{21}$, $R^{22}$ is independently a hydrogen atom, $C_1$-$C_{12}$ alkyl or halogen atom;
each of $L^1$ and $L^2$ is independently a $P(R')_3$ group, wherein R' can be the same or different and is $C_1$-$C_{12}$ alkyl, $C_3$-$C_{14}$ cycloalkyl, $C_5$-$C_{14}$ aryl or $C_3$-$C_{12}$ heteroaryl, and whereby R' groups may interconnect with each other via carbon atoms forming a 3-12 membered ring, or $L^2$ ligands may connect with each other forming a bidentate ligand described by a general formula 5a:

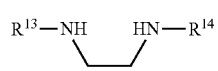

5a wherein:
each of $R^{13}$ and $R^{14}$ is independently a hydrogen atom, $C_1$-$C_{12}$ alkyl or $C_5$-$C_{14}$ aryl, which may be independently substituted with one and/or more substituents selected from the group comprising $C_1$-$C_5$ alkyl, $C_3$-$C_6$ cycloalkyl and $C_5$-$C_{14}$ aryl;
or one of the $L^1$ or $L^2$ ligands is a carbene ligand having the structure:

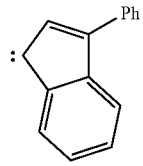

or each of $L^1$ and $L^2$ is independently cyclooctadiene.

Preferably, the activators according to the invention have a structure represented by a structural formula selected from:

1a₁
[CuCl(PPh₃)₁.₅]

1a₂
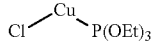

1a₃
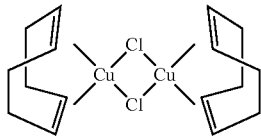

1a₄
[CuCl(DCPD)]

1a₅
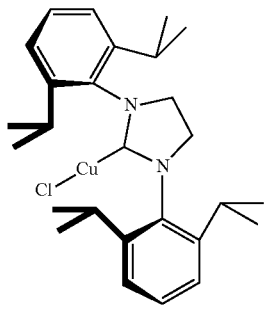

1b₁
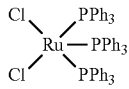

1b₂
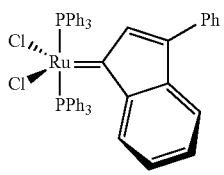

1b₃
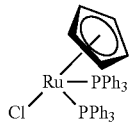

1b₄
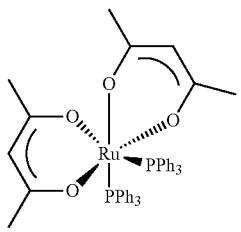

1b₅
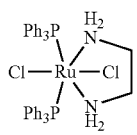

Preferably, the olefin metathesis ruthenium (pre)catalyst is described by a general formula 2, 3a, 3b, 3c 3d or 3e:

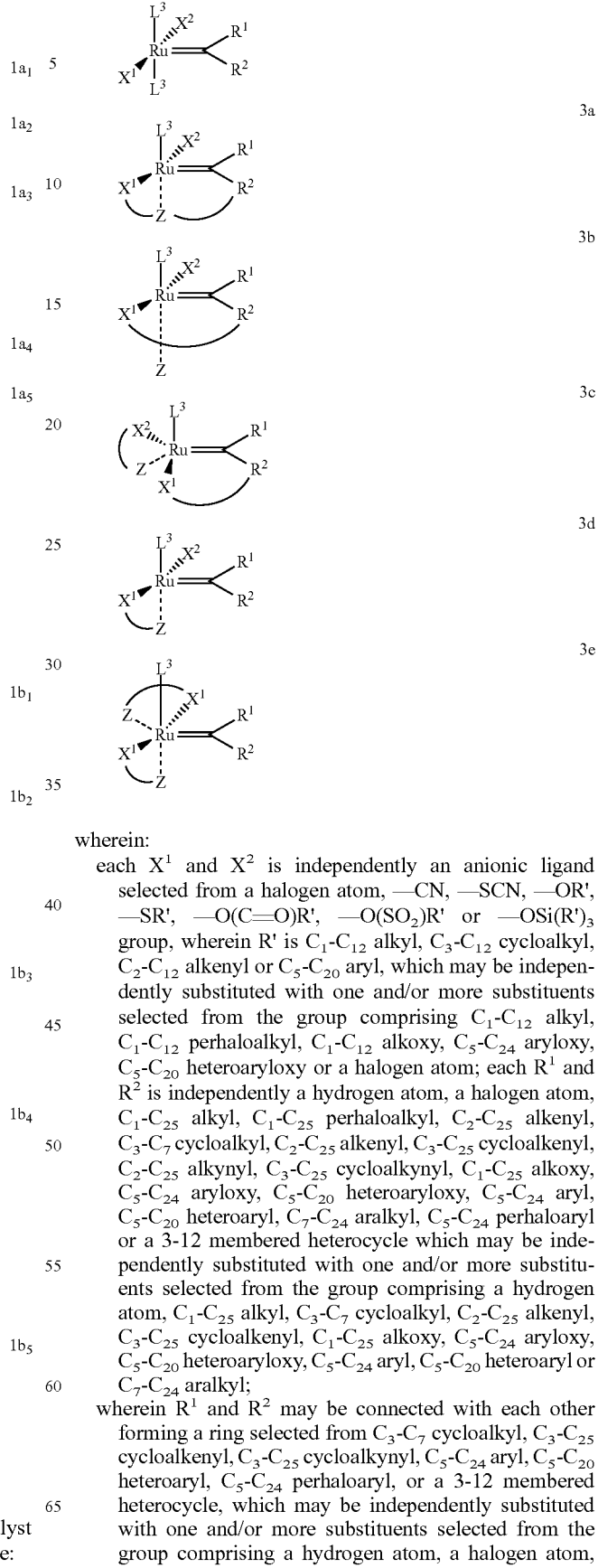

wherein:
each $X^1$ and $X^2$ is independently an anionic ligand selected from a halogen atom, —CN, —SCN, —OR', —SR', —O(C=O)R', —O(SO₂)R' or —OSi(R')₃ group, wherein R' is $C_1$-$C_{12}$ alkyl, $C_3$-$C_{12}$ cycloalkyl, $C_2$-$C_{12}$ alkenyl or $C_5$-$C_{20}$ aryl, which may be independently substituted with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom; each $R^1$ and $R^2$ is independently a hydrogen atom, a halogen atom, $C_1$-$C_{25}$ alkyl, $C_1$-$C_{25}$ perhaloalkyl, $C_2$-$C_{25}$ alkenyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl, $C_7$-$C_{24}$ aralkyl, $C_5$-$C_{24}$ perhaloaryl or a 3-12 membered heterocycle which may be independently substituted with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl or $C_7$-$C_{24}$ aralkyl;

wherein $R^1$ and $R^2$ may be connected with each other forming a ring selected from $C_3$-$C_7$ cycloalkyl, $C_3$-$C_{25}$ cycloalkenyl, $C_3$-$C_{25}$ cycloalkynyl, $C_5$-$C_{24}$ aryl, $C_5$-$C_{20}$ heteroaryl, $C_5$-$C_{24}$ perhaloaryl, or a 3-12 membered heterocycle, which may be independently substituted with one and/or more substituents selected from the group comprising a hydrogen atom, a halogen atom, $C_1$-$C_{25}$ alkyl, $C_1$-$C_{25}$ perhaloalkyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl, $C_7$-$C_{24}$ aralkyl, $C_5$-$C_{24}$ perhaloaryl or a 3-12 membered heterocycle, $L^3$ is a neutral ligand defined by a general formula 4a, 4b or 4c:

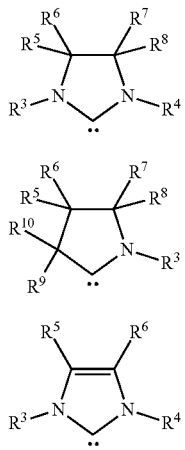

wherein:
  each of $R^3$ and $R^4$ is independently $C_1$-$C_{12}$ alkyl, $C_3$-$C_{12}$ cycloalkyl, $C_5$-$C_{20}$ aryl or $C_5$-$C_{20}$ heteroaryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;
  each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system;
  Z is a P(R')$_3$ group, wherein each R' can be the same or different and is $C_1$-$C_{12}$ alkyl, $C_3$-$C_{12}$ cycloalkyl, $C_5$-$C_{20}$ aryl or $C_3$-$C_{12}$ heteroaryl, and whereby R' groups may interconnect with each other via carbon atoms forming a 3-12 membered ring; or Z may be a neutral ligand; or Z may form bidentate and tridentate ligands;

$X^1\!\_Z\!\_R^2$ is a tridentate ligand;

each of $X^1\!\_Z$, $X^2\!\_Z$ and $X^1\!\_R^2$ is independently a bidentate ligand.

Preferably, the olefin metathesis ruthenium (pre)catalyst is described by a general formula 2, 3a, 3b or 3c:

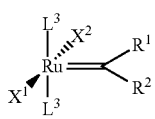

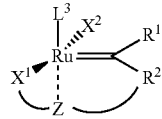

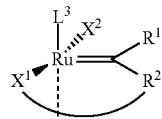

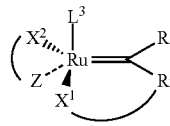

wherein:
  each of $X^1$ and $X^2$ is independently an anionic ligand selected from a halogen atom, —OR' or —O(C=O)R' group, wherein R' is $C_1$-$C_{12}$ alkyl, $C_3$-$C_{12}$ cycloalkyl, $C_2$-$C_{12}$ alkenyl or $C_5$-$C_{20}$ aryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;
  each of $R^1$ and $R^2$ is independently a hydrogen atom, $C_1$-$C_{25}$ alkyl, $C_3$-$C_7$ cycloalkyl, $C_2$-$C_{25}$ alkenyl, $C_3$-$C_{25}$ cycloalkynyl, $C_5$-$C_{24}$ aryl, $C_5$-$C_{20}$ heteroaryl, $C_7$-$C_{24}$ aralkyl or a 3-12 membered heterocycle that may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl or $C_7$-$C_{24}$ aralkyl;
  wherein $R^1$ and $R^2$ may be connected with each other forming a ring selected from a group comprising $C_3$-$C_7$ cycloalkyl, $C_3$-$C_{25}$ cycloalkenyl, $C_5$-$C_{24}$ aryl or a 3-12 membered heterocycle which may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl and $C_7$-$C_{24}$ aralkyl;
  $L^3$ is a neutral ligand defined by a general formula 4a or 4b:

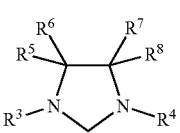

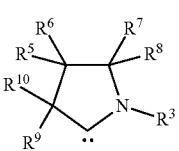

wherein:

each of $R^3$ and $R^4$ is independently $C_5$-$C_{20}$ aryl or $C_5$-$C_{20}$ heteroaryl, optionally substituted with at least one $C_1$-$C_{12}$ alkyl, $C_2$-$C_{12}$ alkoxy or a halogen atom;

each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl, or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system;

Z is a $P(R')_3$ group, wherein each R' may be the same or different and is $C_1$-$C_{12}$ alkyl, $C_3$-$C_{12}$ cycloalkyl or $C_5$-$C_{20}$ aryl;

$X^2\_Z$ is a bidentate ligand defined by a formula:

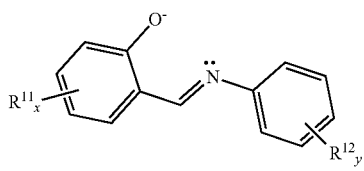

wherein:

x, y are independently integers from 0 to 5;

each of $R^{11}$ and $R^{12}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R'), —SO$_2$N(R')(R'), —CHO or —COR' group, wherein each R' and R" is independently $C_1$-$C_{16}$ alkyl, $C_1$-$C_{16}$ perhaloalkyl, $C_6$-$C_{14}$ aryl or $C_6$-$C_{14}$ perhaloaryl;

$X^1\_R^2$ is a bidentate ligand defined by a formula:

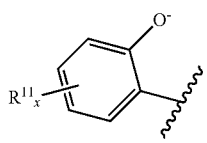

wherein:

x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R'), —SO$_2$N(R')(R'), —CHO or —COR' group, wherein each R' and R" is independently $C_1$-$C_{16}$ alkyl, $C_1$-$C_{16}$ perhaloalkyl, $C_6$-$C_{14}$ aryl or $C_6$-$C_{14}$ perhaloaryl;

$X^1\_Z\_R^2$ is a tridentate ligand defined by a formula:

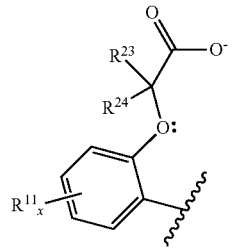

wherein:

x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R'), —SO$_2$N(R')(R'), —CHO or —COR' group, wherein each R' and R" is independently $C_1$-$C_{16}$ alkyl, $C_1$-$C_{16}$ perhaloalkyl, $C_6$-$C_{14}$ aryl or $C_6$-$C_{14}$ perhaloaryl;

each of $R^{23}$ and $R^{24}$ is independently a hydrogen atom, a halogen atom, $C_1$-$C_{16}$ alkyl, $C_1$-$C_6$ alkoxy, $C_3$-$C_7$ cycloalkyl or $C_6$-$C_{14}$ aryl.

Preferably, the olefin metathesis ruthenium (pre)catalyst is defined by a general formula 2, 3a, 3b or 3c:

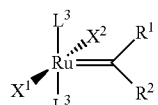

2

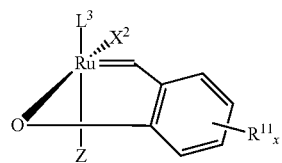

3a

3b

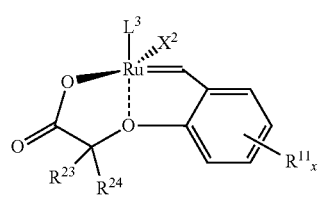

3c wherein:
 $X^1$, $X^2$, $R^1$, $R^2$, Z, $R^{11}$, $R^{12}$, $R^{23}$, $R^{24}$, x are as defined in claim 7;
 $L^3$ is a neutral ligand defined by general formula 4a or 4b:

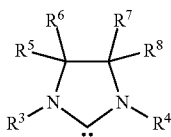

4a

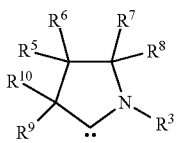

4b wherein:
 each of $R^3$ and $R^4$ is independently $C_5$-$C_{20}$ aryl or $C_5$-$C_{20}$ heteroaryl, optionally substituted with at least one $C_1$-$C_{12}$ alkyl, $C_2$-$C_{12}$ alkoxy or a halogen atom;
 each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system.

Preferably, the metathesis ruthenium (pre)catalyst 2 has the structure defined by a general formula 2a or 2b:

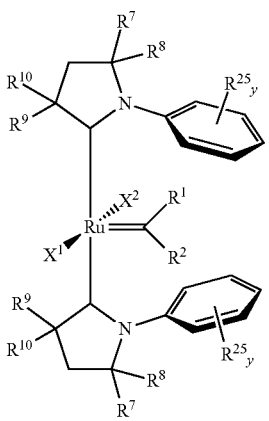

2a

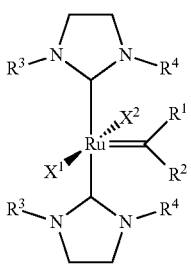

2b wherein:
 $X^1$, $X^2$, $R^1$, $R^2$, $R^3$, $R^4$ are as defined claim 7;
 y is a number from 0 to 5;
 $R^{25}$ is independently $C_1$-$C_{12}$ alkyl, $C_2$-$C_{12}$ alkoxy or a halogen atom;
 each of $R^7$, $R^2$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^7$, $R^8$, $R^9$, $R^{10}$ groups may optionally interconnect with each other forming a $C_4$-$C_{10}$ cyclic or a polycyclic $C_4$-$C_{12}$ system.

Preferably, the olefin metathesis ruthenium (pre)catalyst 2 has the structure defined by a general formula 2a:

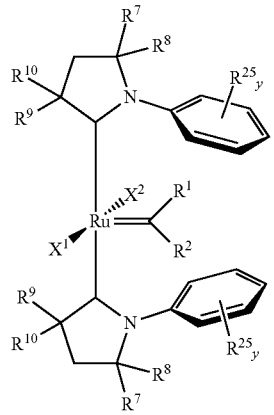

2a wherein:
 $X^1$, $X^2$, $R^1$, $R^2$ are defined in claim 7;
 y is an integer from 1 to 5;
 $R^{25}$ is independently $C^1$-$C^{12}$ alkyl or a halogen atom;
 each of $R^7$, $R^8$, $R^9$, $R^{10}$ is independently a hydrogen atom, $C_1$-$C_{12}$ alkyl, $C_3$-$C_{12}$ cycloalkyl or $C_5$-$C_{20}$ aryl, optionally substituted with at least one $C_1$-$C_{12}$ alkyl, $C_1$-$C_{12}$ perhaloalkyl or a halogen atom, and the $R^7$, $R^8$, $R^9$, $R^{10}$ groups may optionally interconnect with each other forming a $C_4$-$C_{10}$ cyclic or a $C_4$-$C_{12}$ polycyclic system.

Preferably, the olefin metathesis ruthenium (pre)catalyst has a structure represented by a structural formula selected from:

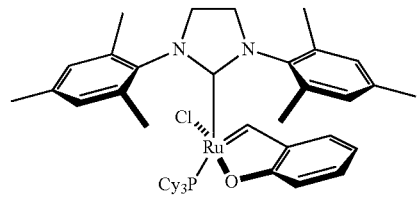

LatMet

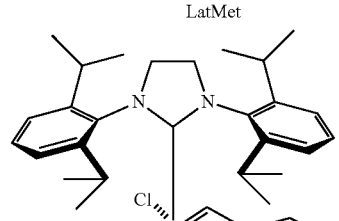

LatMet-SIPr

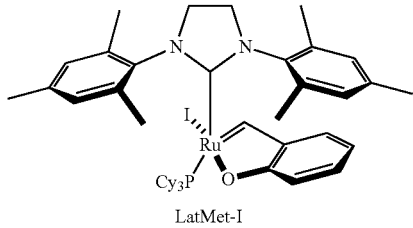

LatMet-I

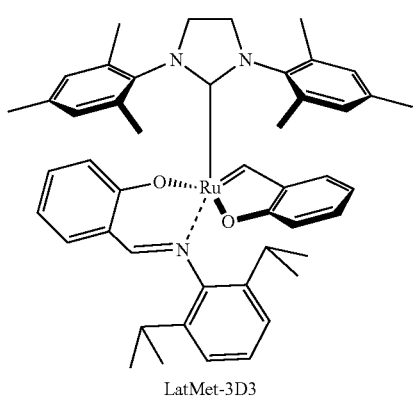

LatMet-3D3

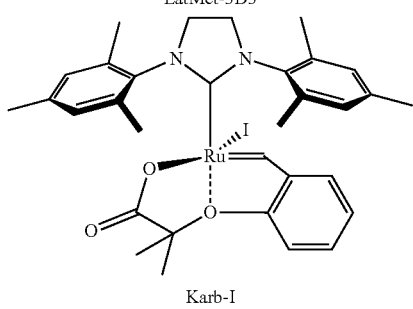

Karb-I

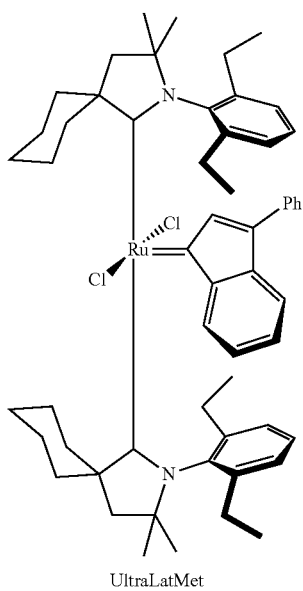

UltraLatMet

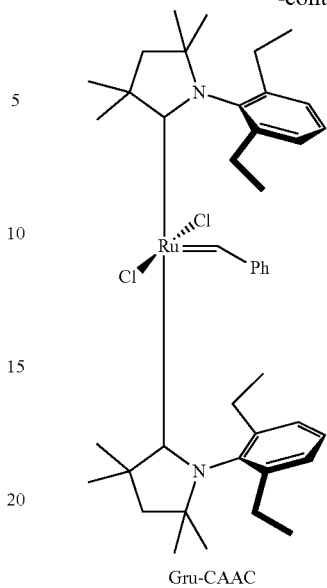

Gru-CAAC

The invention also relates to the use of copper and ruthenium complexes according to the invention for activating metathesis catalysts in ring opening metathesis polymerization reaction (ROMP).

The use of activators according to the invention in the ROMP metathesis reaction allows for obtaining polymers showing better parameters. Materials of higher hardness are obtained (Example 1). In addition, due to the use of activators, it is possible to control the polymerization reaction, via the activators' effect on gelling time and curing time.

Preferably, the reaction is carried out at a temperature from 0 to 100° C.

Preferably, the reaction is carried out over a period of 1 minute to 24 hours.

Preferably, the reaction is carried out with no solvent.

Preferably, the catalyst is added in a solid form and/or in form of a solution in an organic solvent, in an amount of not higher than 100 ppm.

Preferably, the activator is added in a solid form and/or in form of a solution in an organic solvent, in an amount of not higher than 1000 ppm.

Preferably, 4-dimethylaminopyridine in a solid form and/or in form of a solution in an organic solvent is added to the catalyst-activator system in an amount of not higher than 500 ppm.

In the present description, the terms used have the meanings. Non-defined terms in this document have meanings that are given and understood by a person skilled in the art in view of her/his best knowledge, the present disclosure and the patent application context.

Unless indicated otherwise, the following conventional chemistry terms are used in this description that have the meanings indicated as in the definitions below: The term "halogen atom" as used in this description refers to an element selected from F, Cl, Br, I.

The term "carbene" refers to a particle containing a neutral carbon atom with a valence number of two and having two unpaired valence electrons. The term "carbene" also includes carbene analogs wherein the carbon atom is replaced by another chemical element such as boron, silicon, germanium, tin, lead, nitrogen, phosphorus, sulfur, selenium, tellurium.

The term "alkyl" refers to a saturated, linear or branched hydrocarbon substituent having a defined number of carbon atoms. Examples of alkyl substituents are -methyl, -ethyl, -n-propyl, -n-butyl, -n-pentyl, -n-hexyl, -n-heptyl, -n-octyl, -n-nonyl, and -n-decyl. Representative branched $C_1$-$C_{10}$ alkyls include -isopropyl, -sec-butyl, -isobutyl, -tert-butyl, -isopentyl, -neopentyl, -1-methylbutyl, -2-methylbutyl, -3-methylbutyl, -1,1-dimethylpropyl, -1,2-dimethylpropyl, -1-methylpentyl, -2-methylpentyl, -3-methylpentyl, -4-methylpentyl, -1-ethylbutyl, -2-ethylbutyl, -3-ethylbutyl, -1,1-dimethylbutyl, -1,2-dimethylbutyl, -1,3-dimethylbutyl, -2,2-dimethylbutyl, -2,3-dimethylbutyl, -3,3-dimethylbutyl, -1-methylhexyl, -2-methylhexyl, -3-methylhexyl, -4-methylhexyl, -5-methylhexyl, -1,2-dimethylpentyl, -1,3-dimethylpentyl, -1.2-dimethylhexyl, -1,3-dimethylhexyl, -3,3-dimethylhexyl, -1,2-dimethylheptyl, -1,3-dimethylheptyl, and -3,3-dimethylheptyl and the like.

The term "alkoxy" refers to an alkyl substituent as defined above linked via an oxygen atom.

The term "perhaloalkyl" refers to an alkyl group as defined above wherein all hydrogen atoms have been substituted by the same or different halogen atoms.

The term "cycloalkyl" refers to a saturated mono- or polycyclic hydrocarbon substituent having a defined number of carbon atoms. Examples of cycloalkyl substituents are -cyclopropyl, -cyclobutyl, -cyclopentyl, -cyclohexyl, -cycloheptyl, -cyclooctyl, -cyclononyl, -cyclodecyl, and the like.

The term "alkenyl" refers to a saturated, linear or branched non-cyclic hydrocarbon substituent having a defined number of carbon atoms and containing at least one carbon-carbon double bond. Examples of alkenyl substituents are -vinyl, -allyl, -1-butenyl, -2-butenyl, -isobutylenyl, -1-pentenyl, -2-pentenyl, -3-methyl-1-butenyl, -2-methyl-2-butenyl, -2,3-dimethyl-2-butenyl, -1-hexenyl, -2-hexenyl, -3-hexenyl, -1-heptenyl, -2-heptenyl, -3-heptenyl, -1-octenyl, -2-octenyl, -3-octenyl, -1-nonenyl, -2-nonenyl, -3-nonenyl, -1-decenyl, -2-decenyl, -3-decenyl and the like.

The term "aryl" refers to an aromatic mono- or polycyclic hydrocarbon substituent having a defined number of carbon atoms. Examples of aryl substituents are -phenyl, -tolyl, -xylyl, -naphthyl, -2,4,6-trimethylphenyl, -2-fluorophenyl, -4-fluorophenyl, -2,4,6-trifluorophenyl, -2,6-difluorophenyl, -4-nitrophenyl and the like.

The term "aralkyl" refers to an alkyl substituent as defined above substituted with at least one aryl as defined above. Examples of aralkyl substituents are -benzyl, -diphenylmethyl, -triphenylmethyl and the like.

The term "heteroaryl" refers to an aromatic mono- or polycyclic hydrocarbon substituent having a defined number of carbon atoms wherein at least one carbon atom has been substituted by a heteroatom selected from O, N and S. Examples of heteroaryl substituents are -furyl, -thienyl, -imidazolyl, -oxazolyl, -thiazolyl, -isoxazolyl, -triazolyl, -oxadiazolyl, -thiadiazolyl, -tetrazolyl, pyridyl, pyrimidyl, -triazinyl, -indolyl, -benzo[b]furyl, -benzo[b]thienyl, -indazolyl, -benzoimidazolyl, -azaindolyl, -quinolyl, -isoquinolyl, -carbazolyl and the like.

The term "heterocycle" refers to a saturated or partially unsaturated, mono- or polycyclic hydrocarbon substituent having a defined number of carbon atoms wherein at least one carbon atom has been substituted by a heteroatom selected from O, N and S. Examples of heterocyclic substituents are furyl, thiophenyl, pyrrolyl, oxazolyl, imidazolyl, thiazolyl, isoxazolyl, pyrazolyl, isothiazolyl, triazinyl, pyrrolidinonyl, pyrrolidinyl, hydantoinyl, oxiranyl, oxsetanyl, tetrahydrofuranyl, tetrahydrothiophenyl, indolinol, indinolin furanyl, benzo[b]thiophenyl, indazolyl, purinyl, 4H-quinolizinyl, isoquinolyl, quinolyl, phthalazinyl, naphthyridinyl, carbazolyl, P-carbolinyl and the like.

The term "neutral ligand" refers to an non-charged substituent capable of coordinating with a metallic center (ruthenium atom). Examples of such ligands can be: amines, phosphines and their oxides, alkyl and aryl phosphites and phosphates, arsines and their oxides, ethers, alkyl and aryl sulfides, coordinated hydrocarbons, alkyl and aryl halides.

The term "anionic ligand" refers to a substituent capable of coordinating with a metallic center (ruthenium atom), said ligand having a charge capable of partially or fully compensating the metallic center charge. Examples of such ligands may include fluoride, chloride, bromide, iodide, cyanide, cyanate and thiocyanate anions, carboxylic acid anions, alcohol anions, phenol anions, thiol and thiophenol anions, hydrocarbons anions with delocalised charge (e.g. cyclopentadiene), (organo)sulfuric and (organo)phosphoric acid anions and their esters (such as e.g. anions of alkylsulfonic and arylsulfonic acids, anions of alkylphosphoric and arylphosphoric acids, anions of alkyl and aryl esters of sulfuric acid, anions of alkyl and aryl esters of phosphoric acids, anions of alkyl and aryl esters of alkylphosphoric and arylphosphoric acids). Optionally, an anionic ligand may have $L^1$, $L^2$ and $L^3$ groups connected like catechol anion, acetylacetone anion, salicylaldehyde anion. Anionic ligands ($X^1$, $X^2$) and neutral ligands ($L^1$, $L^2$, $L^3$) may be interconnected with each other forming polydentate ligands, e.g. a bidentate ligand ($X_1$-$X^2$), a tridentate ligand ($X^1$—$X^2$-$L^1$), a tetradentate ligand ($X^1$—$X^2$-$L^1$-$L^2$), a bidentate ligand ($X^1$-$L^1$), a tridentate ligand ($X^1$-$L^1$-$L^2$), a tridentate ligand ($X^1$-$L^1$-$L^2$-$L^3$), a bidentate ligand ($L^1$-$L^2$), a tridentate ligand ($L^1$-$L^2$-$L^3$). Examples of such ligands are: catechol anion, acetylacetone anion, and salicylaldehyde anion.

The term "heteroatom" refers to an atom selected from the group of oxygen, sulfur, nitrogen, phosphorus and others.

Project co-financed by the European Union from the European Development Fund Regional under the Intelligent Development Operational Program 2014-2020, under the co-financing agreement no. POIR,01,01,01-00-0888/17-00.

EMBODIMENTS OF THE INVENTION

1. Structures of Activators and (Pre)Catalysts

The following examples are provided solely to illustrate the invention and clarifying its individual aspects, and with no intention to limit it, and should not be identified with its entire scope as defined in the appended claims. Unless otherwise indicated, in the following examples standard materials and methods were used in the art or it was proceeded according to manufacturers' recommendations for specific reagents and methods.

Performance of activators $1a_1$-$1a_5$ and $1b_1$-$1b_5$ according to the invention:

$1a_1$

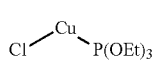

$1a_2$

-continued
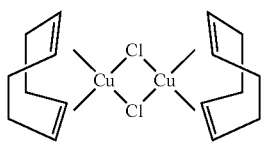
[CuCl(DCPD)]
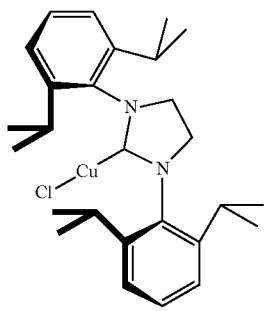
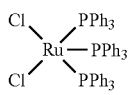
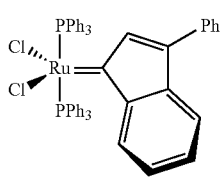
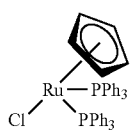
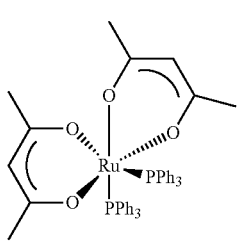
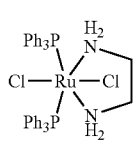
has been verified with (pre)catalysts having the structures illustrated below:
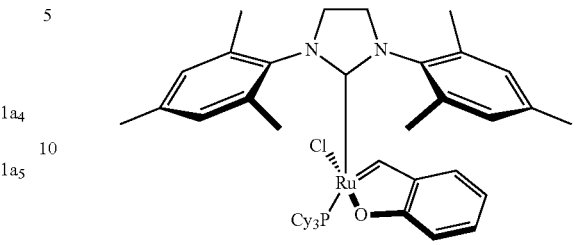
LatMet
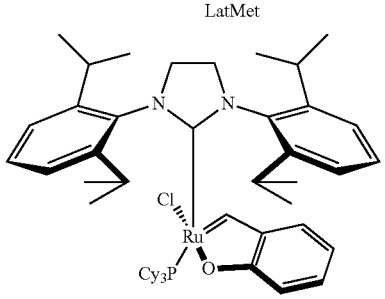
LatMet-SIPr
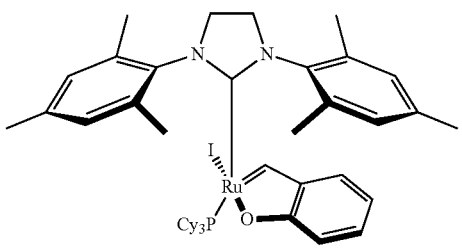
LatMet-I
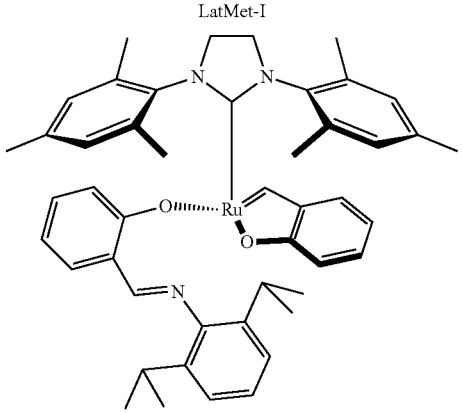
LatMet-3D3
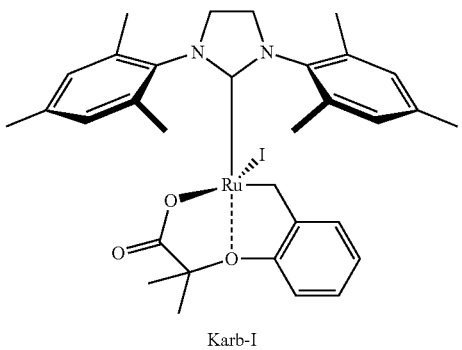
Karb-I -continued

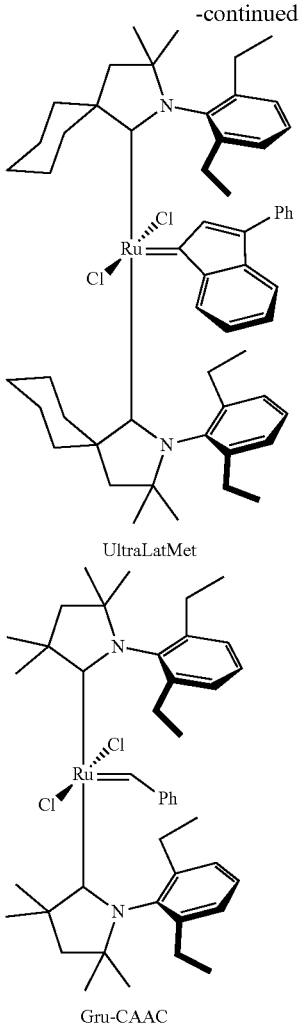

UltraLatMet

Gru-CAAC

2. Experimental Part

DCPD—ULTRENE 99-6 was purchased from Cymetech Corporation. Complexes $1a_1$, $1a_2$ and $1a_4$ were prepared according to own procedures. Compounds $1a_5$, $1b_3$, $1b_4$ and $1b_5$ were prepared according to literature procedures [1, 2, 3, 4]. Complexes $1a_3$, $1b_1$, $1b_2$ and olefin metathesis (pre)catalysts and DMAP are commercially available compounds. DCM was dried using 4A-type molecular sieves.

2.1 Synthesis of Activators

[CuCl(PPh₃)₁.₅]    (1a₁):

Triphenylphosphine (5 g, 19.06 mmol, 2 equivalents) and ethyl acetate (110 mL) were added to a 250 mL round-bottom flask. Further, anhydrous copper chloride (I) (0.94 g, 9.53 mmol, 1 equivalent) was added to the solution. The suspension was stirred for 5 minutes at room temperature. The solid was filtered off on a sintered funnel and washed with two portions of ethyl acetate. DCM was added to the obtained crude product. Most of the solid was dissolved. A small amount of sediment remained. The sediment was filtered off on a sintered funnel. The solvent was evaporated. The product was dried using vacuum pump for several hours. 3.11 g of white powder was obtained, 66% yield.

Elemental analysis—calculated for $C_{27}H_{22.5}ClCu$: C 65.86; H 4.61; found: C 65.92; H 4.62.

[CuCl(P(OEt)₃)]    (1a₂):

Anhydrous copper (I) chloride (11.88 g, 120 mmol, 1.2 equivalents) and degassed DCM (100 mL) were added to a 250 mL round-bottom flask. Triethyl phosphite (17.15 mL, 100 mmol, 1 equivalent) was added to the stirred suspension. The reaction was carried out under argon atmosphere for 30 minutes at room temperature. The reaction mixture was filtered through Celite. The solvent was evaporated. The product was dried using a vacuum pump for several hours. 26.36 g of a colorless, odorless oil was obtained, 44% yield. Air-sensitive compound. Elemental analysis—calculated for $C_6H_{15}OClCu$: C 27.18; H 5.70; found: C 26.86; H, 5.57.

[CuCl(DCPD)]    (1a₄):

Anhydrous copper(I) chloride (1.04 g, 10.51 mmol, 1 equivalent) was added to a 250 mL round-bottom flask containing degassed DCPD ULTRENE 99-6 (100 g, 756 mmol, 72 equivalents). The reaction was carried out under argon atmosphere for 90 minutes at 100° C. A hot, greenish reaction mixture was filtered through Celite. A clear, colorless filtrate was left in the fridge (5° C.) overnight. A white precipitate formed from the filtrate overnight. The white solid was filtered off on a sintered funnel and washed with isopropanol. The product was dried using a vacuum pump for several hours. 1.78 g white powder was obtained, 73% yield. Elemental analysis—calculated for $C_{10}H_{12}ClCu$: C 51.95; H 5.23; found: C 50.94; H 5.30.

2.2. Test Polymerization Reactions

All reactions were carried out under argon atmosphere. The material hardness was examined with a Shore D-type durometer. The exothermic peak temperature was measured by a universal meter (with a thermocouple).

2.2.1 Example I 10 g of DCPD was placed in a 20 ml vial. A solution of respective (pre)catalyst (C=25 mg/mL, DCM, 20 mol ppm with respect to the monomer) was then added. Further, the respective activator selected from $1a_1$, $1a_5$, $1b_1$ and $1b_2$ (C=25 mg/mL, DCM, 40 mol ppm, 2 molar equivalents to catalyst) was added. The vial contents were thoroughly mixed and argonated. The vial with formulation was capped and placed into an oil bath.

TABLE 1

Exemplary DCPD polymerization reactions using Cu(I) and Ru(II) complexes as activators of (pre)catalysts.

| (pre)-catalyst | Activator | Gelling time* [min] | Curing time* [min] | Oil bath temperature [° C.] |
|---|---|---|---|---|
| Karb-I | none | No gelling | No curing | 65 |
| Karb-I | 1b₁ | 07:00 | 15:00 | 65 |
| LatMet | none | 75:00 | No curing after 24 h | 65 |
| LatMet | 1a₅ | 17:40 | 60:00 | 65 |
| LatMet-SiPr | none | 95:00 | No curing | 65 |
| LatMet-SiPr | 1a₅ | 27:00 | No curing after 5 h | 65 |
| LatMet-SiPr | none | 60:00 | No curing | 90 |
| LatMet-SiPr | 1a₅ | 13:20 | No curing after 5 h | 90 |
| LatMet-I | none | No gelling after 3 h | No curing | 65 |

TABLE 1-continued

Exemplary DCPD polymerization reactions using Cu(I) and Ru(II) complexes as activators of (pre)catalysts.

| (pre)-catalyst | Activator | Gelling time* [min] | Curing time* [min] | Oil bath temperature [° C.] |
|---|---|---|---|---|
| LatMet-I | 1a$_5$ | 27:00 | 2 h | 65 |
| LatMet-3D3 | none | No gelling | No curing | 65 |
| LatMet-3D3 | 1b$_1$ | 10:00 | 15:00 | 65 |
| UltraLatMet | none | No gelling after 40 min | No curing | 65 |
| UltraLatMet | 1b$_2$ | 11:00 | No curing after 5 h | 65 |
| UltraLatMet | none | No gelling | No curing | 90 |
| UltraLatMet | 1b$_2$ | 4:00 | 14:30 | 90 |
| UltraLatMet | 1b$_3$ | 3:30 | 9:00 | 90 |
| UltraLatMet | 1b$_4$ | 3:30 | 10:00 | 90 |
| UltraLatMet | 1b$_5$ | 5:00 | 16:00 | 90 |
| Gru-CAAC | none | 30:00 | No curing | 65 |
| Gru-CAAC | 1a$_1$ | 1:00 | 2:00 | 65 |
| none | 1b$_2$ | No gelling after 40 min | No curing | 65 |
| none | 1b$_2$ | No gelling | No curing | 90 |

*Time counted from placing the vial with formulation into an oil bath
Use of the (pre)catalyst-activator system allows for obtaining hardened materials which cannot be obtained using (pre)catalysts alone. It has been also proven that the 1b$_2$ complex (used as a catalyst) does not make the monomer polymerize at 60° C. as well as at 90° C.

2.2.2 Example II 10 g of DCPD was placed in a 20 ml vial. A solution of the UltraLatMet (pre)catalyst (C=25 mg/mL, DCM, 20 mol ppm with respect to the monomer) was then added. Optionally, a DMAP solution (C=25 mg/mL, DCM, 40 mol ppm, 2 equivalents with respect to the catalyst) was also added. A DCM solution of respective activator selected from 1a$_1$-1a$_5$ was then added. The formulation components were thoroughly mixed. A thermocouple tip was inserted into the middle of the liquid. The vial with the formulation was argonated and capped. Polymerization was carried out at room temperature or at elevated temperatures in an oil bath. The results are shown in the table below.

TABLE 2

Activation of the UltraLatMet (pre)catalyst with selected Cu(I) complexes - DCPD polymerization.

| Activator [ppm] | DMAP | Gelling time* [min] | Curing time* [min] | Oil bath temp. [° C.] | Exothermic peak temp. [° C.] | Hardness (Shore D scale) |
|---|---|---|---|---|---|---|
| 1a$_1$ 2 | — | 00:50 | 3:40 | RT | 186 | 84.8 |
| 1a$_1$ 4 | — | 00:50 | 03:10 | RT | 196 | 86.4 |
| 1a$_1$ 7 | — | 00:55 | 02:30 | RT | 196 | 85.8 |
| 1a$_1$ 20 | — | 01:05 | 02:40 | RT | 178 | 79.4 |
| 1a$_1$ 2 | + | 02:00 | 07:10 | 65 | 211 | 85.0 |
| 1a$_1$ 4 | + | 01:30 | 04:10 | 65 | 213 | 83.4 |
| 1a$_1$ 7 | + | 01:15 | 02:40 | 65 | 212 | 80.2 |
| 1a$_1$ 15 | + | 01:20 | 03:00 | 65 | 193 | 73.4 |
| 1a$_2$ 3 | — | 01:05 | 04:00 | RT | 192 | 85.4 |
| 1a$_2$ 5 | — | 01:00 | 02:50 | RT | 197 | 86.4 |
| 1a$_2$ 10 | — | 00:50 | 02:30 | RT | 195 | 86.2 |
| 1a$_2$ 20 | — | 00:50 | 02:30 | RT | 162 | 74.8 |
| 1a$_2$ 3 | + | 01:40 | 04:30 | 65 | 209 | 84.8 |
| 1a$_2$ 5 | + | 01:45 | 03:40 | 65 | 211 | 82.2 |
| 1a$_2$ 10 | + | 01:40 | 02:50 | 65 | 205 | 82.0 |
| 1a$_2$ 20 | + | 01:20 | 02:40 | 65 | 182 | 40.0 |
| 1a$_3$ 5 | - | 00:40 | 02:10 | RT | — | 87.1 |
| 1a$_3$ 230 | 2 equiv. | — | — | RT | — | 64.0 |
| 1a$_3$ 10 | 6 equiv. | — | — | 90 | 180 | 50.0 |
| 1a$_4$ 2 | — | 00:50 | | RT | — | 87.0 |
| 1a$_4$ 5 | — | 00:25 | 01:00 | RT | — | 87.0 |
| 1a$_4$ 20 | — | 00:38 | 02:20 | RT | — | 77.0 |

TABLE 2-continued

Activation of the UltraLatMet (pre)catalyst with selected Cu(I) complexes - DCPD polymerization.

| Activator [ppm] | DMAP | Gelling time* [min] | Curing time* [min] | Oil bath temp. [° C.] | Exothermic peak temp. [° C.] | Hardness (Shore D scale) |
|---|---|---|---|---|---|---|
| 1a$_5$ 20 | — | 00:40 | 8:40 | 80 | 206 | 75.0 |
| 1a$_4$ 20 | + | 3:00 | 12:10 | 80 | 206 | 82.0 |

*Time counted from adding the activator or from inserting the formulation vial into the oil bath in the event of reactions carried out at elevated temperature.
Use of activators - copper complexes according to the invention, in a concentration exceeding 10 ppm (except for 1a$_5$ in combination with 4-DMAP) material with a hardness lower than reported in the literature (approx. 82, Schore's D Scale). 4-DMAP as a polymerization retardant is compatible with the activators tested - copper complexes. A change in the activator concentration has a greater impact on curing time than gelling time. The type and concentration of the copper complex is, along with the polymerization temperature (room temperature/oil bath temperature) and presence, a factor allowing to control gelling time and curing time.

2.2.3 Example III

Formulation 1 and 2

100 g of DCPD was added to a round-bottomed flask (250 ml), followed by the addition of a solution of UltraLatMet in DCM (25 mg/mL), so that the final concentration of UltraLatMet was 20 ppm (molar parts calculated with respect to DCPD). The flask contents were mixed thoroughly to obtain the formulation no. 1. 50 g of the resulting solution was transferred to a round-bottom flask (100 mL) and a DMAP solution in DCM (50 mg/mL) was added so that the final DMAP concentration was 40 mol ppm—the formulation no. 2. 10 g of solution was taken from each formulation and transferred to separate vials (20 mL), which were heated in an oil bath at 95° C. until the polymerized material was obtained (approx. 25-35 minutes).

Formulation 3

A solution of UltraLatMet in DCM (25 mg/mL), a solution of DMAP in DCM (50 mg/mL) and a solution of 1b$_1$ in DCM (50 mg/mL) were successively added to a round-bottom flask (100 mL). The flask contents were mixed and then the solvent was quickly evaporated by purging the flask with argon stream. A thin layer of brown-red sediment was formed on the walls of the flask. 50 g DCPD was added to the flask and the contents were mixed until the previously formed sediment layer was completely dissolved. Mixing was carried out under protective argon atmosphere. In the resulting solution, the final concentrations of the catalytic system components, i.e. UltraLatMet, DMAP and 1b$_1$ were 28, 200 and 79 ppm (molar), respectively. 10 g of the solution obtained thereby was transferred to a vial (20 mL), which was heated in an oil bath at 80° C. for about 20 minutes until polymerized material was obtained.

Table 3

Properties of selected polymers obtained using the UltraLatMet (pre)catalyst.

| | Formulation 1 UltraLatMet 20 ppm | Formulation 2 UltraLatMet 20 ppm + DMAP 40 ppm | Formulation 3 UltraLatMet 28 ppm + DMAP 200 ppm + 1b$_1$ 79 ppm |
|---|---|---|---|
| Oil bath temperature [° C.] | 95 | 95 | 80 |
| Glass-transition temperature Tg [° C.] | 152 ± 12 | 142 ± 13 | 171 ± 5 |

Table 3-continued

Properties of selected polymers obtained using the UltraLatMet (pre)catalyst.

|  | Formulation 1 UltraLatMet 20 ppm | Formulation 2 UltraLatMet 20 ppm + DMAP 40 ppm | Formulation 3 UltraLatMet 28 ppm + DMAP 200 ppm + 1b$_1$ 79 ppm |
|---|---|---|---|
| Curing time [min] | 22:20 ± 1:10 | 31:50 ± 2:45 | 18:50 ± 1:10 |
| Temperature peak [° C.] | 221 ± 2 | 215 ± 3 | 221 ± 2 |
| Hardness (Shore D scale) | 80-85 | 75-83 | 88.3 ± 0.2 |
| Tensile strength [MPa] | 38.8 ± 1.9 | 35.1 ± 6.5 | 55 ± 0.2 |
| Young's modulus [GPa] | 1.87 ± 0.13 | 1.95 ± 0.19 | 1.87 ± 0.06 |
| Storage time at 20° C.* | 11 h | 180 h | 3 weeks |

*Storage time at 20° C. is "shelf time" (or pot life), i.e. the period for which a formulation can be stored before getting so thick that it cannot be used again, or before the catalyst decomposes.

Material obtained from the formulation 3, i.e. using the activation method according to of the invention, is characterized by a glass-transition temperature of approx. 20-30° C. higher than the material obtained with no activator addition. Using the activator allowed to achieve a much higher tensile strength value of the synthesized polymer.

It is worth noting that UltraLatMet does not polymerize at 90° C. (Table 1) but initiates polymerization at 95° C. (Table 3). This is not a mistake but rather its specific feature, that raising the temperature by just 5° C. results in thermal activation of this (pre)catalyst.

3. Literature

[1] C. A. Citadelle, E. Le Nouy, F. Bisaro, A. M. Z. Slawin, C. S. J. Cazin, Dalton Trans. 2010, 39, 4489-4491.
[2] T. Wilczewski, M. Bochefiska, J. F. Biernat, J. Organomet. Chem. 1981, 215, 87-96.
[3] J. D. Gilbert, G. Wilkinson, J. Chem. Soc. A, 1969, 0, 1749-1753.
[4] P. D. de Koning, M. Jackson, L. C. Lennon, Org. Process Res. Dev. 2006, 10, 1054-1058.

The invention claimed is:

1. A method, comprising:
activating olefin metathesis ruthenium (pre)catalysts in a metathesis reaction using one of the following compounds:
copper complexes having at least one organic ligand, or ruthenium complexes having at least one organic ligand;
wherein the copper complexes being the activators of olefin metathesis ruthenium (pre)catalysts have the structure described by a general formula 1a:

(CuX$_a$L$_b$)$_c$    1a wherein:
a is 1 or 2;
b is an integer from 1 to 3;
c is 1 or 2;
X is an anionic ligand selected from a halogen atom, —CN, —SCN, —OR', —SR', —O(C=O)R', —O(SO$_2$)R' or —OSi(R')$_3$ group, wherein R' is a $C_1$-$C_{12}$ alkyl, $C_3$-$C_{12}$ cycloalkyl, $C_2$-$C_{12}$ alkenyl or $C_5$-$C_{20}$ aryl;
L is independently a neutral ligand selected independently from cyclooctadiene, dicyclopentadiene (DCPD) and a P(R')$_3$ group, wherein each R' may be the same or different and denotes $C_1$-$C_{12}$ alkyl, $C_3$-$C_{12}$ cycloalkyl, $C_5$-$C_{20}$ aryl, $C_2$-$C_{12}$ alkoxy, $C_5$-$C_{24}$ aryloxy or $C_3$-$C_{12}$ heteroaryl, and R' groups may interconnect with each other via carbon atoms forming a 3-12 membered ring;
whereby the neutral L ligands may interconnect with each other, forming bidentate or tridentate ligands;
or L is a neutral ligand defined by a general formula 4a, 4b or 4c:

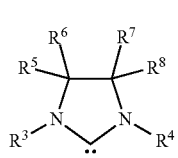

4a

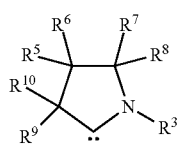

4b

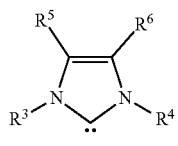

4c wherein:
each of $R^3$ and $R^4$ is independently $C_1$-$C_{12}$ alkyl, $C_3$-$C_{12}$ cycloalkyl, $C_5$-$C_{20}$ aryl or $C_5$-$C_{20}$ heteroaryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;
each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system;
wherein the ruthenium complexes being activators of olefin metathesis ruthenium (pre)catalysts have a structure described by a general formula 1b:

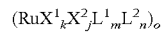

(RuX$^1_k$X$^2_j$L$^1_m$L$^2_n$)$_o$    1b wherein:
k is an integer from 0 to 2;
l is 0 or 1;
m is an integer from 0 to 4;
n is an integer from 0 to 2;
o is the number 1 or 2;
each of X$^1$ and X$^2$ is independently a halogen atom, or —O(C=O)R' group, wherein R' is $C_1$-$C_{12}$ alkyl, $C_3$-$C_{14}$ cycloalkyl or $C_5$-$C_{14}$ aryl, and wherein R' is optionally substituted with at least one $C_1$-$C_5$ alkyl, $C_3$-$C_6$ cycloalkyl, $C_5$-$C_{14}$ aryl or a halogen atom;
or each of X$^1$ and X$^2$ is independently an anionic ligand;
each of L$^1$ and L$^2$ is independently a P(R')$_3$ group, wherein each R' may be the same or different and is $C_1$-$C_{12}$ alkyl, $C_3$-$C_{14}$ cycloalkyl, $C_5$-$C_{14}$ aryl or $C_3$-$C_{12}$ heteroaryl, and R' groups may interconnect with each other via carbon atoms forming a 3-12 membered ring;

or $L^1$ and/or $L^2$ are ligands and may connect with each other forming a bidentate ligand defined by general formulae 5a or 5b:

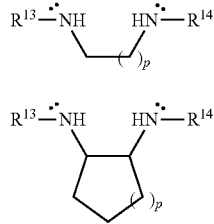

wherein:
p is the number 1 or 2;
each of $R^{13}$ and $R^{14}$ is independently a hydrogen atom, $C_1$-$C_{12}$ alkyl, $C_3$-$C_{14}$ cycloalkyl or $C_5$-$C_{14}$ aryl, optionally substituted with at least one $C_1$-$C_5$ alkyl, $C_3$-$C_6$ cycloalkyl, $C_5$-$C_{14}$ aryl or halogen atom;
or $L^2$ ligand is a carbene ligand of the structure:

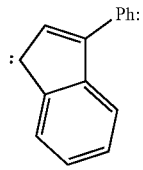

or each of $L^1$ and $L^2$ is independently a neutral ligand selected from benzene, p-cymene, mesitylene and cyclooctadiene.

2. The method according to claim 1, wherein:
X is independently an anionic ligand selected from a halogen atom, O(C=O)R', OR' or —SR' group, wherein R' is a $C_1$-$C_{12}$ alkyl, a $C_5$-$C_{20}$ aryl;
L is independently a neutral ligand selected independently from cyclooctadiene, dicyclopentadiene (DCPD) and a P(R')$_3$ group, wherein each R' may be the same or different and is $C_1$-$C_{12}$ alkyl, $C_3$-$C_{12}$ cycloalkyl, $C_5$-$C_{20}$ aryl, $C_2$-$C_{12}$ alkoxy, $C_5$-$C_{24}$ aryloxy or $C_3$-$C_{12}$ heteroaryl, and whereby R' groups may interconnect with each other via carbon atoms forming a 3-12 membered ring;
or L is a neutral ligand defined by the general formulae 4a or 4b:

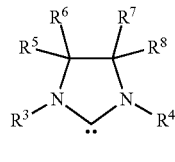

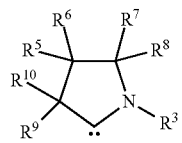

wherein:
each of $X^1$ and $X^2$ is independently a halogen atom, or —O(C=O)R' group, wherein R' is $C_1$-$C_{12}$ alkyl, $C_3$-$C_{14}$ cycloalkyl or $C_5$-$C_{14}$ aryl, and wherein R' is optionally substituted with at least one $C_1$-$C_5$ alkyl, $C_3$-$C_6$ cycloalkyl, $C_5$-$C_{14}$ aryl or a halogen atom;
or each of $X^1$ and $X^2$ is independently an anionic ligand defined by general formulae 6a, 6b and 6c:

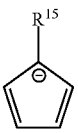

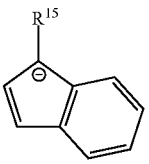

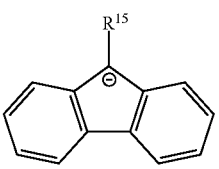

wherein:
$R^{15}$ is a hydrogen atom, $C_1$-$C_{12}$ alkyl, $C_3$-$C_{14}$ cycloalkyl, $C_5$-$C_{14}$ aryl, —(C=O)R' group or —O(C=O)R' group, wherein R' is $C_1$-$C_{12}$ alkyl, $C_3$-$C_{14}$ cycloalkyl or $C_5$-$C_{14}$ cycloalkyl or $C_5$-$C_{14}$ aryl, whereby $R^{15}$ is optionally substituted with at least one $C_1$-$C_5$ alkyl, $C_3$-$C_6$ cycloalkyl, $C_5$-$C_{14}$ aryl or a halogen atom;
or $X^1$ and $X^2$ are a bidentate anionic ligand defined by a general formula 7a:

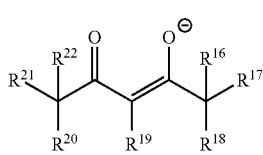

wherein:
each of $R^{16}$, $R^{17}$, $R^{18}$, $R^{19}$, $R^{20}$, $R^{21}$, $R^{22}$ is independently a hydrogen atom, $C_1$-$C_{12}$ alkyl, $C_3$-$C_{14}$ cycloalkyl, $C_5$-$C_{14}$ aryl or halogen atom; whereby each of $R^{16}$, $R^{17}$, $R^{18}$, $R^{19}$, $R^{20}$, $R^{21}$, $R^{22}$ is optionally substituted with at least one $C_1$-$C_5$ alkyl, $C_3$-$C_6$ cycloalkyl, $C_5$-$C_{14}$ aryl or a halogen atom;
each $L^1$ and $L^2$ is independently a P(R')$_3$ group, wherein each R' can be the same or different and is $C_1$-$C_{12}$ alkyl, $C_3$-$C_{14}$ cycloalkyl, $C_5$-$C_{14}$ aryl or $C_3$-$C_{12}$heteroaryl, and whereby R' groups may interconnect each other via carbon atoms forming a 3-12 membered ring,
or $L^1$ and/or $L^2$ ligands may connect with each other forming a bidentate ligand defined by the general formulae 5a or 5b:

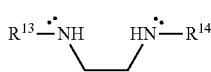

-continued

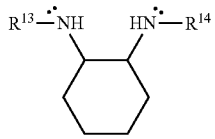

5b wherein:
each of $R^{13}$ and $R^{14}$ is independently a hydrogen atom, $C_1$-$C_{12}$ alkyl or $C_5$-$C_{14}$ aryl, which may be independently substituted with one and/or more substituents selected from the group comprising $C_1$-$C_5$ alkyl, $C_3$-$C_6$ cycloalkyl or $C_5$-$C_{14}$ aryl;
or $L^2$ ligand is a carbene ligand having the structure:

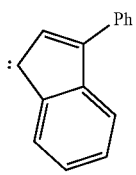

or each $L^1$ and $L^2$ is independently a neutral ligand selected from benzene and cyclooctadiene.

3. The method according to claim 1, wherein:
X is a halogen atom,
L is independently a neutral ligand selected independently from cyclooctadiene, dicyclopentadiene (DCPD) and a P(R')$_3$ group, wherein each R' may be the same or different and is $C_1$-$C_{12}$ alkyl, $C_3$-$C_{12}$ cycloalkyl or $C_5$-$C_{20}$ aryl, and whereby R' groups may interconnect with each other via carbon atoms forming a 3-12 membered ring; whereby neutral ligands L may interconnect with each other forming bidentate or tridentate ligands;
or L is a neutral ligand defined by the general formula 4a:

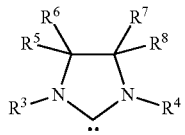

4a wherein:
each of $R^3$ and $R^4$ is independently $C_5$-$C_{20}$ aryl, optionally substituted with at least one $C_1$-$C_{12}$ alkyl;
each of $R^5$, $R^6$, $R^7$, $R^8$ is independently a hydrogen atom;
wherein:
each of $X^1$ and $X^2$ is independently a halogen atom, or —O(C=O)R' group, wherein R' is $C_1$-$C_{12}$ alkyl, $C_3$-$C_{14}$ cycloalkyl or $C_5$-$C_{14}$ aryl, whereby R' is optionally substituted with at least one $C_1$-$C_5$ alkyl, $C_3$-$C_6$ cycloalkyl, $C_5$-$C_{14}$ aryl or a halogen atom;
or each of $X^1$ and $X^2$ is independently anionic ligand described by a general formula 6a:

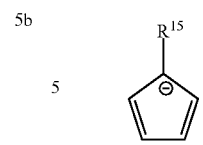

6a wherein:
$R^{15}$ is a hydrogen atom, $C_1$-$C_{12}$ alkyl, $C_3$-$C_{14}$ cycloalkyl, $C_5$-$C_{14}$ aryl or a —O(C=0)R' group, wherein R' is $C_1$-$C_{12}$ alkyl, $C_3$-$C_{14}$ cycloalkyl or $C_5$-$C_{14}$ aryl, whereby $R^{15}$ is optionally substituted with at least one $C_1$-$C_5$ alkyl, $C_3$-$C_6$ cycloalkyl, $C_5$-$C_{14}$ aryl, or a halogen atom;
or $X^1$, $X^2$ are a bidentate anionic ligand defined by a general formula 7a:

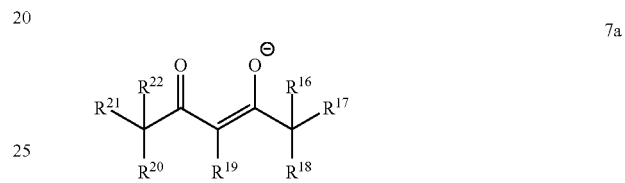

7a wherein:
each of $R^{16}$, $R^{17}$, $R^{18}$, $R^{19}$, $R^{20}$, $R^{21}$, $R^{22}$ is independently a hydrogen atom, $C_1$-$C_{12}$ alkyl or halogen atom;
each of $L^1$ and $L^2$ is independently a P(R')$_3$ group, wherein R' can be the same or different and is $C_1$-$C_{12}$ alkyl, $C_3$-$C_{14}$ cycloalkyl, $C_5$-$C_{14}$ aryl or $C_3$-$C_{12}$ heteroaryl, and whereby R' groups may interconnect with each other via carbon atoms forming a 3-12 membered ring,
or $L^2$ ligands may connect with each other forming a bidentate ligand described by the general formula 5a:

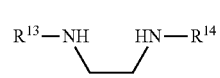

5a wherein:
each of $R^{13}$ and $R^{14}$ is independently a hydrogen atom, $C_1$-$C_{12}$ alkyl or $C_5$-$C_{14}$ aryl, which may be independently substituted with one and/or more substituents selected from the group comprising $C_1$-$C_5$ alkyl, $C_3$-$C_6$ cycloalkyl and $C_5$-$C_{14}$ aryl;
or one of the $L^1$ or $L^2$ ligands is a carbene ligand having the structure:

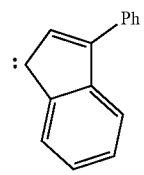

or each of $L^1$ or $L^2$ is independently cyclooctadiene.

4. The method according to claim 1, wherein the activators have a structure represented by a structural formula selected from:

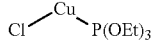
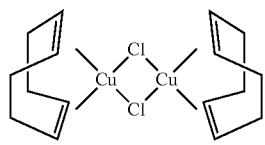
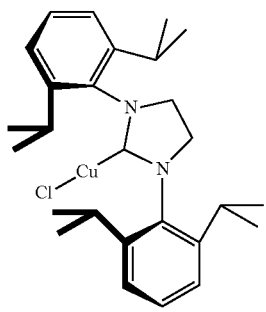
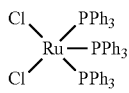
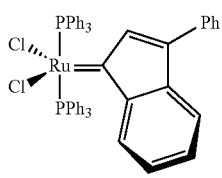
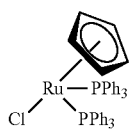
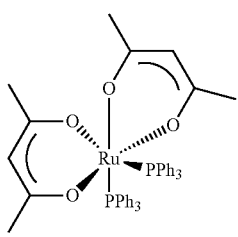
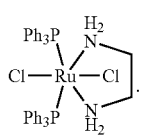
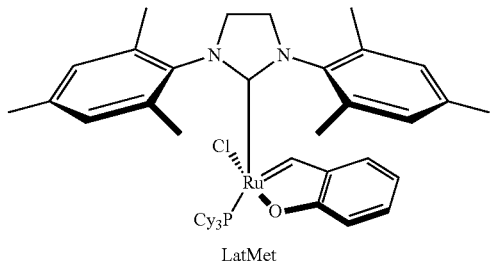
5. The method according to claim 1, wherein the olefin metathesis ruthenium (pre)catalyst has a structure represented by a structural formula selected from:

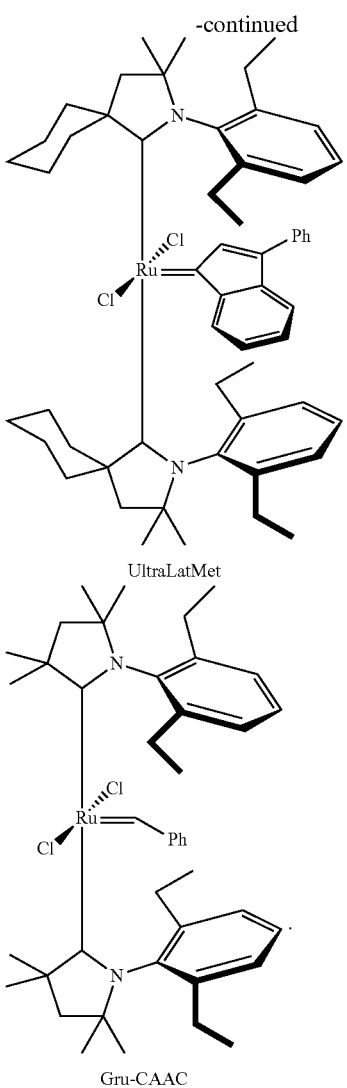

UltraLatMet

Gru-CAAC

6. The method according to claim 1, wherein the metathesis reaction is carried out at a temperature from 0 to 100° C.

7. The method according to claim 1, wherein the metathesis reaction is carried out over a period of 1 minute to 24 hours.

8. The method according to claim 1, wherein the metathesis reaction is carried out with no solvent.

9. The method according to claim 1, wherein the catalyst is added in a solid form and/or in form of a solution in an organic solvent, in an amount not higher than 100 ppm.

10. The method according to claim 1, wherein the activator is added in a solid form and/or in form of a solution in an organic solvent, in an amount not higher than 1000 ppm.

11. The method according to claim 1, wherein 4-dimethylaminopyridine in a solid form and/or in form of a solution in an organic solvent is added to the catalyst-activator system in an amount of not higher than 500 ppm.

12. The method of claim 1, wherein the metathesis reaction comprises a ring opening metathesis polymerization reaction (ROMP).

13. A method, comprising:
activating olefin metathesis ruthenium (pre)catalysts in a metathesis reaction using one of the following compounds;
copper complexes having at least one organic ligand, or ruthenium complexes having at least one organic ligand; wherein the olefin metathesis ruthenium (pre)catalyst is described by a general formula 2, 3a, 3b, 3c 3d or 3e:

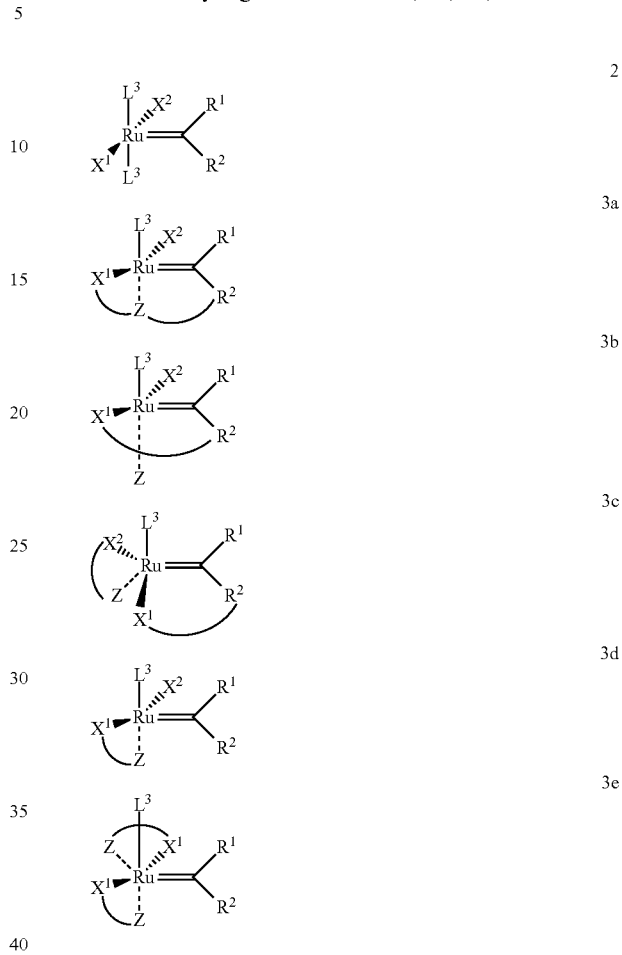

wherein:
each $X^1$ and $X^2$ is independently an anionic ligand selected from a halogen atom, —CN, —SCN, —OR', —SR', —O(C=O)R', —O(SO$_2$)R' or —OSi(R')$_3$ group, wherein R' is $C_1$-$C_{12}$ alkyl, $C_3$-$C_{12}$ cycloalkyl, $C_2$-$C_{12}$ alkenyl or $C_5$-$C_{20}$ aryl, which may be independently substituted with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;

each $R^1$ and $R^2$ is independently a hydrogen atom, a halogen atom, $C_1$-$C_{25}$ alkyl, $C_1$-$C_{25}$ perhaloalkyl, $C_2$-$C_{25}$ alkenyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl, $C_7$-$C_{24}$ aralkyl, $C_5$-$C_{24}$ perhaloaryl or a 3-12 membered heterocycle which may be independently substituted with one and/or more substituents selected from the group comprising a hydrogen atom, $C_1$-$C_{25}$ alkyl, $C_3$-$C_7$ cycloalkyl, $C_2$-$C_{25}$ alkenyl, $C_2$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl or $C_7$-$C_{24}$ aralkyl;

$R^1$ and $R^2$ may be connected with each other forming a ring selected from $C_3$-$C_7$ cycloalkyl, $C_3$-$C_{25}$ cycloalkenyl, $C_3$-$C_{25}$ cycloalkynyl, $C_5$-$C_{24}$ aryl, $C_5$-$C_{20}$ heteroaryl, $C_5$-$C_{24}$ perhaloaryl, or a 3-12 membered heterocycle, which may be independently substituted with one and/or more substituents selected from the group comprising a hydrogen atom, a halogen atom, $C_1$-$C_{25}$ alkyl, $C_1$-$C_{25}$ perhaloalkyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$cycloalkynyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl, $C_7$-$C_{24}$ aralkyl, $C_5$-$C_{24}$ perhaloaryl or a 3-12 membered heterocycle;

$L^3$ is a neutral ligand defined by a general formula 4a, 4b or 4c:

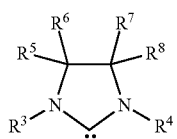

4a

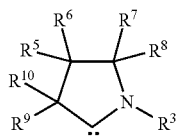

4b

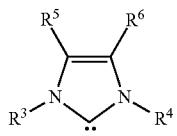

4c wherein:

each of $R^3$ and $R^4$ is independently $C_1$-$C_{12}$ alkyl, $C_3$-$C_{12}$ cycloalkyl, $C_5$-$C_{20}$ aryl or $C_5$-$C_{20}$ heteroaryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;

each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system;

Z is a $P(R')_3$ group, wherein each R' can be the same or different and is $C_1$-$C_{12}$ alkyl, $C_3$-$C_{12}$ cycloalkyl, $C_5$-$C_{20}$ aryl or $C_3$-$C_{12}$ heteroaryl, and whereby R' groups may interconnect with each other via carbon atoms forming a 3-12 membered ring;

or Z may be a neutral ligand;

or Z may form bidentate and tridentate ligands;

⌐Z⌐$R^2$ is a tridentate ligand;

each of ⌐Z, $X^2$⌐Z and ⌐$R^2$ is independently a bidentate ligand.

14. The method according to claim 13, wherein the olefin metathesis ruthenium (pre)catalyst is described by the general formula 2, 3a, 3b or 3c:

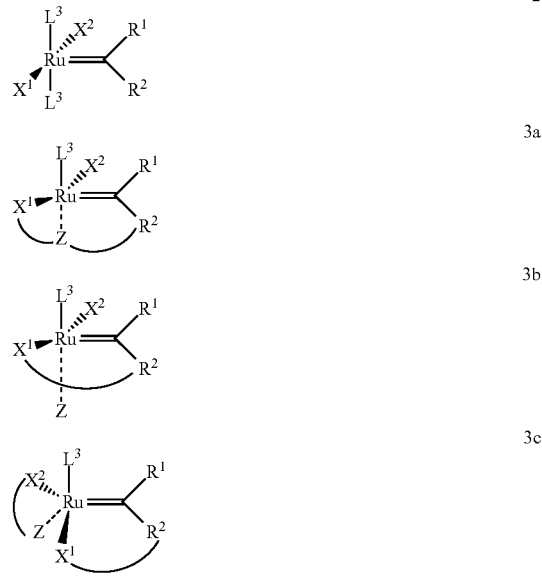

wherein:

each of $X^1$ and $X^2$ is independently an anionic ligand selected from a halogen atom, OR' or O(C=O)R' group, wherein R' is $C_1$-$C_{12}$ alkyl, $C_3$-$C_{12}$ cycloalkyl, $C_2$-$C_{12}$ alkenyl or $C_5$-$C_{20}$ aryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;

each of $R^1$ and $R^2$ is independently a hydrogen atom, $C_1$-$C_{25}$ alkyl, $C_3$-$C_7$ cycloalkyl, $C_2$-$C_{25}$ alkenyl, $C_3$-$C_{25}$ cycloalkynyl, $C_5$-$C_{24}$ aryl, $C_5$-$C_{20}$ heteroaryl, $C_7$-$C_{24}$ aralkyl or a 3-12 membered heterocycle that may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl or $C_7$-$C_{24}$ aralkyl;

$R^1$ and $R^2$ may be connected with each other forming a ring selected from a group comprising $C_3$-$C_7$ cycloalkyl, $C_3$-$C_{25}$ cycloalkenyl, $C_5$-$C_{24}$ aryl or a 3-12 membered heterocycle which may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl and $C_7$-$C_{24}$ aralkyl;

$L^3$ is a neutral ligand defined by the general formula 4a or 4b:

4a

-continued

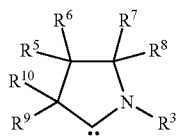
4b wherein:

each of $R^3$ and $R^4$ is independently $C_5$-$C_{20}$ aryl or $C_5$-$C_{20}$ heteroaryl, optionally substituted with at least one $C_1$-$C_{12}$ alkyl, $C_2$-$C_{12}$ alkoxy or a halogen atom;

Z is a $P(R')_3$ group, wherein each R' may be the same or different and $C_1$-$C_{12}$ alkyl, $C_3$-$C_{12}$ cycloalkyl or $C_5$-$C_{20}$ aryl;

⌒Z is a bidentate ligand defined by a formula:

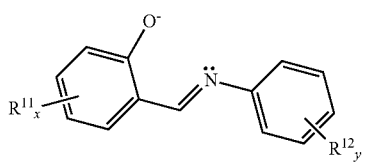

wherein:

x and y are independently integers from 0 to 5;

each of $R^{11}$ and $R^{12}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R'), —SO$_2$N(R')(R''), —CHO or —COR' group, wherein each R' and R'' is independently $C_1$-$C_{16}$ perhaloalkyl, $C_6$-$C_{14}$ aryl or $C_6$-$C_{14}$ perhaloaryl;

$X^1$⌒$R^2$ is a bidentate ligand defined by a formula:

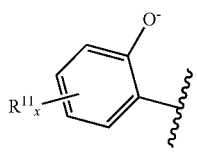

wherein:

x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R''), —SO$_2$N(R')(R''), —CHO or —COR' group, wherein each R' and R'' is independently $C_1$-$C_{16}$ alkyl, $C_1$-$C_{16}$ perhaloalkyl, $C_6$-$C_{14}$ aryl or $C_6$-$C_{14}$ perhaloaryl;

$X^1$⌒Z⌒$R^2$ is a tridentate ligand defined by a formula:

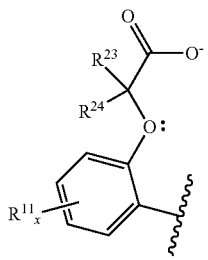

wherein:

x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R''), —SO$_2$N(R')(R''), —CHO or —COR' group, wherein each R' and R'' is independently $C_1$-$C_{16}$ alkyl, $C_1$-$C_{16}$ perhaloalkyl, $C_6$-$C_{14}$ aryl or $C_6$-$C_{14}$ perhaloaryl;

each of $R^{23}$ and $R^{24}$ is independently a hydrogen atom, a halogen atom, $C_1$-$C_{16}$ alkyl, $C_1$-$C_6$ alkoxy, $C_3$-$C_7$ cycloalkyl or $C_6$-$C_{14}$ aryl.

15. The method according to claim 13, wherein the olefin metathesis ruthenium (pre)catalyst is defined by the a general formula 2, 3a, 3b or 3c:

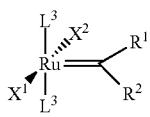
2

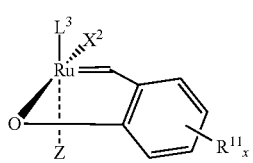
3a

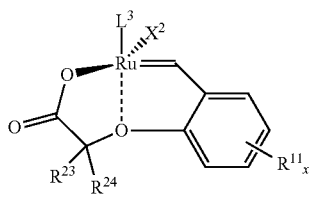
3b

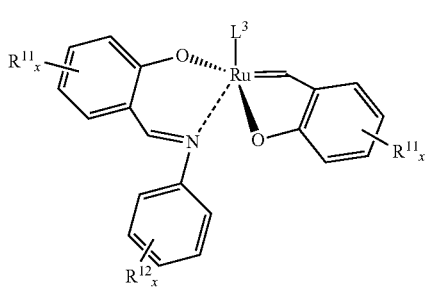
3c wherein:

each of $X^1$ and $X^2$ is independently an anionic ligand selected from a halogen atom, OR' or O(C=O)R' group, wherein R' is $C_1$-$C_{12}$ alkyl, $C_3$-$C_{12}$ cycloalkyl, $C_2$-$C_{12}$ alkenyl or $C_5$-$C_{20}$ aryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;

each of $R^1$ and $R^2$ is independently a hydrogen atom, $C_1$-$C_{25}$ alkyl, $C_3$-$C_7$ cycloalkyl, $C_2$-$C_{25}$ alkenyl, $C_3$-$C_{25}$ cycloalkynyl, $C_5$-$C_{24}$ aryl, $C_5$-$C_{20}$ heteroaryl, $C_7$-$C_{24}$ aralkyl or a 3-12 membered heterocycle that may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl or $C_7$-$C_{24}$ aralkyl;

$R^1$ and $R^2$ may be connected with each other forming a ring selected from a group comprising $C_3$-$C_7$ cycloalkyl, $C_3$-$C_{25}$ cycloalkenyl, $C_5$-$C_{24}$ aryl or a 3-12 membered heterocycle which may be substituted independently with one and/or more substituents selected from the group comprising a hydrogen atom, $C_1$-$C_{25}$ alkyl, $C_3$-$C_7$ cycloalkyl, $C_2$-$C_{25}$ alkenyl, $C_3$-$C_{25}$ cycloalkenyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl and $C_7$-$C_{24}$ aralkyl;

$L^3$ is a neutral ligand defined by the general formula 4a or 4b:

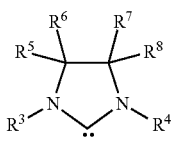

4a

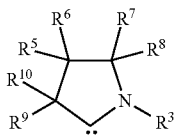

4b wherein:
each of $R^3$ and $R^4$ is independently $C_5$-$C_{20}$ aryl or $C_5$-$C_{20}$ heteroaryl, optionally substituted with at least one $C_1$-$C_{12}$ alkyl, $C_2$-$C_{12}$ alkoxy or a halogen atom;

Z is a $P(R')_3$ group, wherein each R' may be the same or different and $C_1$-$C_{12}$ alkyl, $C_3$-$C_{12}$ cycloalkyl or $C_5$-$C_{20}$ aryl;

$X^2 \diagup Z$ is a bidentate ligand defined by a formula:

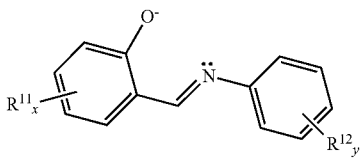

wherein:
x is an integer from 0 to 5;

each of $R^{11}$ and $R^{12}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R"), —SO$_2$N(R')(R"), —CHO or —COR' group, wherein each R' and R' is independently $C_1$-$C_{16}$ perhaloalkyl, $C_6$-$C_{14}$ aryl or $C_6$-$C_{14}$ perhaloaryl;

$X^1 \diagup R^2$ is a bidentate ligand defined by a formula:

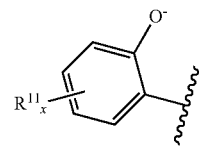

wherein:
x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R"), —SO$_2$N(R')(R"), —CHO or —COR' group, wherein each R' and R" is independently $C_1$-$C_{16}$ alkyl, $C_1$-$C_{16}$ perhaloalkyl, $C_6$-$C_{14}$ aryl or $C_6$-$C_{14}$ perhaloaryl;

$X^1 \diagup Z \diagup R^2$ is a tridentate ligand defined by a formula:

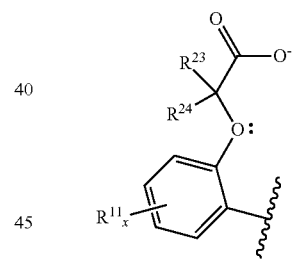

wherein:
x is an integer from 0 to 4;

$R^{11}$ is independently a hydrogen atom, a halogen atom, $C_1$-$C_{16}$ alkyl, $C_1$-$C_6$ alkoxy, $C_1$-$C_{16}$ perhaloalkyl, $C_3$-$C_7$ cycloalkyl, $C_2$-$C_{16}$ alkenyl, $C_6$-$C_{14}$ aryl, $C_6$-$C_{14}$ perhaloaryl, $C_3$-$C_{12}$ heterocycle, —OR', —NO$_2$, —COOH, —COOR', —CON(R')(R"), —SO$_2$N(R') (R"), —CHO or —COR' group, wherein each R' and R" is independently $C_1$-$C_{16}$ alkyl, $C_1$-$C_{16}$ perhaloalkyl, $C_6$-$C_{14}$ aryl or $C_6$-$C_{14}$ perhaloaryl;

each of $R^{23}$ and $R^{24}$ is independently a hydrogen atom, a halogen atom, $C_1$-$C_{16}$ alkyl, $C_1$-$C_6$ alkoxy, $C_3$-$C_7$ cycloalkyl or $C_6$-$C_{14}$ aryl.

16. The method according to claim 15, wherein the metathesis ruthenium (pre)catalyst 2 has the structure defined by a general formula 2a or 2b:

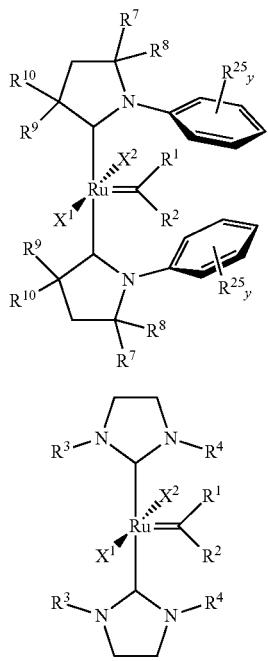

2a

2b wherein:
each of $R^3$ and $R^4$ is independently $C_5$-$C_{20}$ aryl or $C_5$-$C_{20}$ heteroaryl, optionally substituted with at least one $C_1$-$C_{12}$ alkyl, $C_2$-$C_{12}$ alkoxy or a halogen atom;

y is a number from 0 to 5;

$R^{25}$ is independently $C_1$-$C_{12}$ alkyl, $C_2$-$C_{12}$ alkoxy or a halogen atom;

each of $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^7$, $R^8$, $R^9$, $R^{10}$ groups may optionally interconnect with each other forming a $C_4$-$C_{10}$ cyclic or a polycyclic $C_4$-$C_{12}$ system.

17. The use according to claim 15, wherein the olefin metathesis ruthenium (pre)catalyst 2 has the structure defined by a general formula 2a:

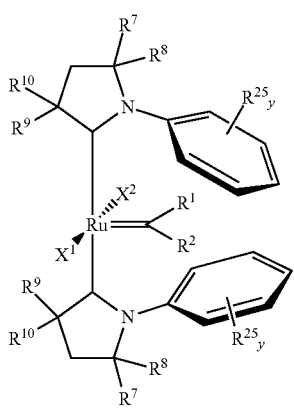

2a wherein:
y is an integer from 1 to 5;
$R^{25}$ is independently $C_1$-$C_{12}$ alkyl or a halogen atom;
each of $R^7$, $R^8$, $R^9$, $R^{10}$ is independently a hydrogen atom, $C_1$-$C_{12}$ alkyl, $C_3$-$C_{12}$ cycloalkyl or $C_5$-$C_{20}$ aryl, optionally substituted with at least one $C_1$-$C_{12}$ alkyl, $C_1$-$C_{12}$ perhaloalkyl or a halogen atom, and the $R^7$, $R^8$, $R^9$, $R^{10}$ groups may optionally interconnect with each other forming a $C_4$-$C_{10}$ cyclic or a $C_4$-$C_{12}$ polycyclic system.

18. A method, comprising:
activating olefin metathesis ruthenium (pre)catalysts in a metathesis reaction using one of the following compounds;
copper complexes having at least one organic ligand, or
ruthenium complexes having at least one organic ligand;
wherein the copper complexes being the activators of olefin metathesis ruthenium (pre)catalysts have the structure defined by a general formula 1a:

$$(CuX_aL_b)_c \qquad 1a$$

wherein:
a is 1 or 2;
b is an integer from 1 to 3;
c is 1 or 2;
X is independently an anionic ligand selected from a halogen atom, O(C=O)R', OR' or —SR' group, wherein R' is a $C_1$-$C_{12}$ alkyl, a $C_5$-$C_{20}$ aryl;
L is independently a neutral ligand selected independently from cyclooctadiene, dicyclopentadiene (DCPD) and a P(R')$_3$ group, wherein each R' may be the same or different and is $C_1$-$C_{12}$ alkyl, $C_3$-$C_{12}$ cycloalkyl, $C_5$-$C_{20}$ aryl, $C_2$-$C_{12}$ alkoxy, $C_5$-$C_{24}$ aryloxy or $C_3$-$C_{12}$ heteroaryl, and whereby R' groups may interconnect with each other via carbon atoms forming a 3-12 membered ring; where the neutral L ligands may interconnect with each other, forming bidentate or tridentate ligands; or L is a neutral ligand defined by general formulae 4a or 4b:

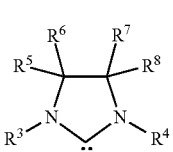

4a

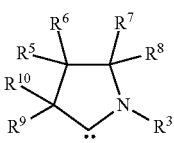

4b wherein:
each of $R^3$ and $R^4$ is independently $C_1$-$C_{12}$ alkyl, $C_3$-$C_{12}$ cycloalkyl, $C_5$-$C_{20}$ aryl or $C_5$-$C_{20}$ heteroaryl, which may be substituted independently with one and/or more substituents selected from the group comprising $C_1$-$C_{12}$ alkyl, $C_1$-$C_{12}$ perhaloalkyl, $C_1$-$C_{12}$ alkoxy, $C_5$-$C_{24}$ aryloxy, $C_5$-$C_{20}$ heteroaryloxy or a halogen atom;
each of $R^5$, $R^6$, $R^7$, $R^8$, $R^9$, $R^{10}$ is independently a hydrogen atom, $C_1$-$C_{12}$ alkyl, $C_3$-$C_{12}$ cycloalkyl, $C_5$-$C_{20}$ aryl or $C_5$-$C_{20}$ heteroaryl, optionally substituted with at least one $C_1$-$C_{12}$ alkyl, $C_1$-$C_{12}$ perhaloalkyl, $C_1$-$C_{12}$ alkoxy or a halogen atom, and the $R^5$, $R^6$, $R^7$, $R^8$, $R^9$, $R^{10}$ groups may optionally interconnect with each other forming a $C_4$-$C_{10}$ cyclic or a $C_4$-$C_{12}$ polycyclic system;

wherein the ruthenium complexes being the activators of olefin metathesis ruthenium (pre)catalysts have the structure defined by a general formula 1b:

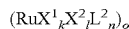

1b wherein:
k is an integer from 0 to 2;
l is 0 or 1;
m is an integer from 0 to 4;
n is an integer from 0 to 2;
o is 1 or 2;
each of $X^1$ and $X^2$ is independently a halogen atom, —O(C=O)R' group, wherein R' is $C_1$-$C_{12}$ alkyl, $C_3$-$C_{14}$ cycloalkyl or $C_5$-$C_{14}$ aryl, and wherein R' is optionally substituted with at least one $C_1$-$C_5$ alkyl, $C_3$-$C_6$ cycloalkyl, $C_5$-$C_{14}$ aryl or a halogen atom;
or each of $X^1$ and $X^2$ is independently an anionic ligand defined by general formulae 6a, 6b and 6c:

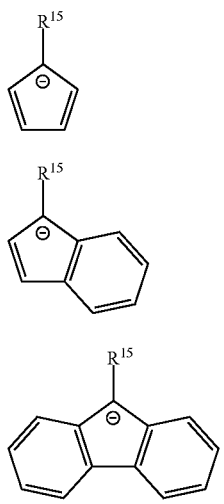

wherein:
$R^{15}$ is a hydrogen atom, $C_1$-$C_{12}$ alkyl, $C_3$-$C_{14}$ cycloalkyl, $C_5$-$C_{14}$ aryl, or —O(C=O)R' group, wherein R' is $C_1$-$C_{12}$ alkyl, $C_3$-$C_{14}$ cycloalkyl or $C_5$-$C_{14}$ cycloalkyl or $C_5$-$C_{14}$ aryl, whereby $R^{15}$ is optionally substituted with at least one $C_1$-$C_5$ alkyl, $C_3$-$C_6$ cycloalkyl, $C_5$-$C_{14}$ aryl or a halogen atom;
or $X^1$ and $X^2$ are a bidentate anionic ligand defined by a general formula 7a:

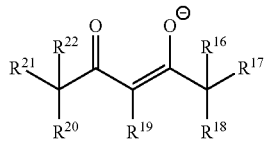

wherein
each of $R^{16}$, $R^{17}$, $R^{18}$, $R^{19}$, $R^{20}$, $R^{21}$, $R^{22}$ is independently a hydrogen atom, $C_1$-$C_{12}$ alkyl, $C_3$-$C_{14}$ cycloalkyl, $C_5$-$C_{14}$ aryl or halogen atom; whereby each of $R^{16}$, $R^{17}$, $R^{18}$, $R^{19}$, $R^{20}$, $R^{21}$, $R^{22}$ is optionally substituted with at least one $C_1$-$C_5$ alkyl, $C_3$-$C_6$ cycloalkyl, $C_5$-$C_{14}$ aryl or a halogen atom;
each $L^1$ and $L^2$ is independently a P(R')$_3$ group, wherein each R' can be the same or different and is $C_1$-$C_{12}$ alkyl, $C_3$-$C_{14}$ cycloalkyl, $C_5$-$C_{14}$ aryl or $C_3$-$C_{12}$heteroaryl, and whereby R' groups may interconnect each other via carbon atoms forming a 3-12 membered ring;
or $L^1$ and/or $L^2$ are ligands and may connect with each other forming a bidentate ligand defined by general formulae 5a or 5b:

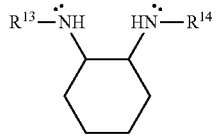

wherein:
each of $R^{13}$ and $R^{14}$ is independently a hydrogen atom, $C_1$-$C_{12}$ alkyl or $C_5$-$C_{14}$ aryl, which may be independently substituted with one and/or more substituents selected from the group comprising $C_1$-$C_5$ alkyl, $C_3$-$C_6$ cycloalkyl or $C_5$-$C_{14}$ aryl;
or $L^2$ ligand is a carbene ligand having the structure:

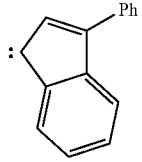

or each $L^1$ and $L^2$ is independently a neutral ligand selected from benzene and cyclooctadiene.

* * * * *